United States Patent [19]

Tukahara et al.

[11] Patent Number: 5,829,483

[45] Date of Patent: Nov. 3, 1998

[54] HOSE

[75] Inventors: Masamitu Tukahara; Shinji Ito; Tadanobu Iwasa; Fujio Ninomiya; Hiroyuki Mori; Joji Kasugai; Hidetoshi Ishihara; Masayuki Nakagawa, all of Nakashima-gun, Japan

[73] Assignee: Toyoda Gosei Co., Ltd., Aichi-ken, Japan

[21] Appl. No.: 538,802

[22] Filed: Oct. 3, 1995

Related U.S. Application Data

[62] Division of Ser. No. 143,886, Nov. 1, 1993, abandoned.

[30] Foreign Application Priority Data

| Oct. 30, 1992 | [JP] | Japan | 4-292667 |
| Dec. 25, 1992 | [JP] | Japan | 4-346431 |
| Jan. 22, 1993 | [JP] | Japan | 5-9267 |
| Jan. 25, 1993 | [JP] | Japan | 5-10133 |
| Apr. 23, 1993 | [JP] | Japan | 5-97464 |
| Apr. 27, 1993 | [JP] | Japan | 5-100743 |
| Apr. 27, 1993 | [JP] | Japan | 5-100748 |
| Apr. 28, 1993 | [JP] | Japan | 5-102150 |

[51] Int. Cl.⁶ .................................................. F16L 9/06
[52] U.S. Cl. ............................ 138/109; 138/114; 138/121; 138/148
[58] Field of Search ........................... 138/121, 122, 138/114, 137, 109, 119, 148

[56] References Cited

U.S. PATENT DOCUMENTS

| 2,898,941 | 8/1959 | Kilcup | 138/121 |
| 3,037,798 | 6/1962 | Cooper | 138/122 |
| 3,076,737 | 2/1963 | Roberts | 138/121 |
| 3,934,617 | 1/1976 | Henderson | 138/178 |
| 3,934,618 | 1/1976 | Henderson | 138/178 |
| 4,086,665 | 5/1978 | Poirier | 138/121 |
| 4,582,092 | 4/1986 | Nissen | 138/109 |
| 4,599,784 | 7/1986 | Canu, Jr. et al. | 138/122 |

FOREIGN PATENT DOCUMENTS

| 58-42483 | 9/1981 | Japan . |
| 1-77183 | 5/1989 | Japan . |
| 4-259545 | 9/1992 | Japan . |

*Primary Examiner*—David Scherbel
*Assistant Examiner*—James F. Hook
*Attorney, Agent, or Firm*—Cushman Darby & Cushman IP Group of Pillsbury Madison & Sutro LLP

[57] ABSTRACT

A hose includes an outer hose member, and an inner hose member. The outer hose member includes a first bellows-like tubular portion at least in the intermediate area in the axial direction. The inner hose member is disposed substantially coaxially in the outer hose member, includes a second bellows-like tubular portions in the area corresponding to the first bellows-like tubular portion of the outer hose member, and adapted to form a tubular air layer between the second bellows-like tubular portion and the first bellows-like tubular portion. Because of the outer hose member and the inner hose member, the hose exhibits a high flexibility, a reliable barrier ability against gasoline fuels or the like, and an improved adiabatic ability and anti-flammability for the inner hose member.

3 Claims, 27 Drawing Sheets

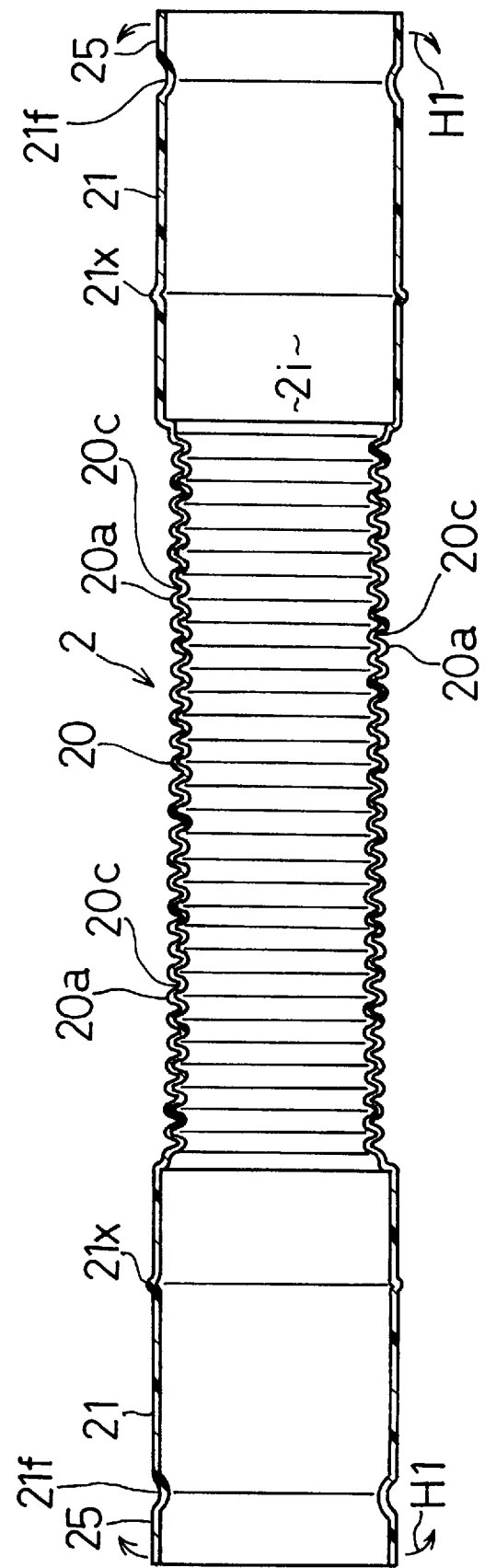

HOSE

This is a division of application Ser. No. 08/143,886, filed Nov. 1, 1993, abandoned.

BACKGROUND OF THE INVENTION

1. Field of the invention

The present invention relates to a hose suitable for use as a fuel hose which is adapted to convey a fuel such as, for example gasoline.

2. Description of the Prior Art

Fuel hoses have been required to be constructed to reduce permeation during their service life of the fluids being conveyed. For example, in the automobile industry reduction of fuel evaporation from automobiles has been required in order to purify the atmosphere. Accordingly, automobile fuel supply hoses have been required to further reduce permeation of the fuel through them.

In addition, hoses used for conveying gasoline are required to be flexible and have a high barrier ability against gasoline vapor. Such a hose has been formed of polyamide resin fluoroelastomer (FKM elastomer), and was comprised of an axially extending bellows-like tubular portion in an intermediate area of the hose. However, while a hose formed of polyamide resin provides a suitable barrier, it is not adequately anti-flammable because it is made of resin. On the other hand, when the hose is formed of the fluoroelastomer, it has a satisfactory anti-flammability, but has high manufacturing costs.

Further, there has been provided a rubber hose free from the bellows-like tubular portion in which a polyamide resin layer is buried in the peripheral wall. Such rubber hose provides a suitable barrier, but exhibits insufficient flexibility because it has no bellows-like portion.

Hoses of a double tube construction have been developed recently. For instance, Japanese Examined Utility Model Publication (KOKOKU) No. 1-31,839 discloses a flexible tube which includes a bellows-like metallic flexible tube, and a plastic outer tube joined closely to the straight tubular portions of the flexible tube at the ends by heating followed by contracting. Japanese Unexamined Utility Model Publication (KOKAI) No. 58-42,484 discloses a flexible tube which includes a bellows-like outer tube and a bellow-like inner tube disposed substantially concentrically in the outer tube, and in which the inner tube has corrugation height designed to be smaller than that of the outer tube. Japanese Unexamined Utility Model Publication (KOKAI) No. 50-80,621 discloses an automobile fuel filler hose which includes a straight tube-shaped guide hose and bellows-like tubular protector hose covering the outer periphery of the guide hose. Also, Japanese Unexamined Utility Model Publication (KOKAI) No. 3-114,427 discloses a filler pipe construction adapted for vehicle use which includes a filler pipe molded integrally with a fuel tank and having a fragile portion at a part in the axially lengthwise direction, and a flexible hose covering the whole outer periphery of the filler pipe.

With these double tube constructions, the outer members can be formed by using rubber materials having excellent anti-flammability and flexibility, and the inner members can be formed from polyamide materials having the superb barrier ability against the gasoline fuels. Thus, hoses having such double tube construction can satisfy the flexibility and the barrier ability simultaneously.

However, when the inner hose member is formed independently of the outer hose member and subsequently disposed in the outer hose member to produce hoses having double tube constructions, the inner hose member is usually formed by using resin in a straight tubular shape. Consequently, there arises a problem in that the inner hose member lacks the designed flexibility. In addition, there might arise a fear that the sealing property might be inadequate between the inner hose member and the mating member during service so that the fluid might permeate through the boundary areas between the outer hose member and the inner hose member.

SUMMARY OF THE INVENTION

The present invention has been developed to overcome the problems associated with the conventional hoses described above.

It is a primary object of the present invention to provide a hose having a bellows portion that provides excellent vapor barrier and flexibility characteristics.

It is a secondary object of the present invention to improve the sealing constructions of the conventional hoses, thereby providing a hose which can advantageously reduce fluid permeation.

The invention includes inner end other hose members. The outer hose member includes a first bellows-like tubular portion, at least in an intermediate area thereof, that extends in an axial direction.

The inner hose member is disposed substantially coaxially in the outer hose member and includes a second bellows-like tubular portion in an area corresponding to the first bellows-like tubular portion of the outer hose member. A tubular air layer is also formed between the first and second bellows-like tubular portions. This air layer or open space between the first and second bellows-like portions can be achieved by designing the height and pitch between the tops (ribs) or bottoms (grooves) of the bellow corrugations.

In view of the desirable anti-flammability, anti-wear and anti-oil properties, and the like, it is preferred that the material for the outer hose can be at least one selected from the group consisting of nitrile rubber (NBR), mixtures of nitrile rubber (NBR) and polyvinyl chloride (PVC), epichlorohydrin rubber (Co or ECO), and fluoroelastomer (FKM). In view of the barrier ability, it is preferred that the material for the inner hose can be polyamide (PA) resin, or more particularly, to obtain good flexibility, nylon 11.

The average thickness of the outer hose member depends on the material used. For example, when the outer hose member is formed of nitrile rubber, the average thickness can be designed so as to fall in a range of from about 1 to about 4 mm, approximately. Likewise, the average thickness of the inner hose member depends on the material to be used. For instance, when the inner hose member is formed of polyamide resin, the average thickness can be designed so as to fall in a range of from 0.2 to 2 mm, approximately.

A tubular air layer is formed between the second bellows-like tubular portion of the inner hose member and the first bellows-like tubular portion of the outer hose member. The average thickness of the space between these members, the tubular air layer, can be designed at one's discretion.

The present hose can be manufactured as follows. First, the outer hose member and inner hose member are formed independently of each other. Then, the outer hose member is assembled with the inner hose member by engaging one end of the outer hose member with one end of the inner hose member so that the inner hose slides axially into the outer hose. An adhesive layer or a thermally fusible layer can be disposed in the boundary area between the inner and outer hose. When a thermally fusible material is employed, it can be in the form of a thermally fusible film, e.g., a polyester film, and can be disposed in a designed boundary area between the outer and inner hose members.

Due to the use of the two bellows areas, when the present hose flexes and deforms, each of the two bellows-like tubular portions deform independently one another, and exhibits a highly flexible hose product.

Furthermore, the tubular air layer operates as an adiabatic air layer. Accordingly, heat is less likely to transfer from the outside to the inner hose member, thereby providing a further improved adiabatic ability and better anti-flammability property for the inner hose member.

The present hose can be fastened to a mating member by a variety of techniques. For instance, a tubular sealing member, an independent component number, is formed of rubber independently of the present hose. Then, the sealing member is disposed between the outer periphery of the mating member and the inner periphery of the end of the inner hose member. Use could also be made of a clamping ring about the hose and sealing member.

A second embodiment of the present hose includes a second bellows-like tubular portion and a second straight tubular portion or part of the inner hose structure. A straight tubular portion extends from both ends of the second bellows-like portion, the second straight tubular portion is adapted to face the first straight tubular portion of the outer hose and accommodate a mating member therein.

A tubular sealing member is disposed at least at an end of the outer hose member in an axially lengthwise direction of the outer hose member. The sealing member includes a ring-shaped groove adapted to accommodate a first straight tubular portion of the outer hose member and the second straight tubular portion of the inner hose member therein in a superimposing manner, and can be fastened around the first straight tubular portion with a clamping member disposed outside thereof.

In the second aspect of such a hose, a first straight tubular portion of the outer hose member and a second straight tubular portion of the inner hose member are superimposed, and are accommodated in a ring-shaped groove of the tubular sealing member. Under such circumstances, the mating member is disposed in the second straight tubular portion of the inner hose member, and the sealing member is fastened by the clamping member disposed outside thereof.

In the second embodiment, the following boundary areas are sealed: the boundary area between the second straight tubular portion of the inner hose member and the sealing member, the boundary area between the second straight tubular portion of the inner hose member and the first straight tubular portion of the outer hose member, the boundary area between the first straight tubular portion of the outer hose member and the sealing member, and the boundary area between the mating member and the sealing member. As a result, the fluid, such as the gasoline fuels, flowing therethrough is inhibited from permeating through the boundary areas.

However, such a fastening method requires independent production of the sealing member and placement between the outer hose member and the inner hose member. Accordingly, the number of the component parts increases, and assembly man-hour requirements increase.

To overcome such shortcomings, the second embodiment can be modified by forming the outer hose with an outer end as an insertion opening.

The inner hose can then be modified to have an inner end disposed inside with respect to the outer end of the outer hose member in an axial direction of the outer hose member and substantially coaxially in the outer end of the outer hose member.

Further, the thus modified present hose is preferably fastened to the mating member such as a pipe, with a first clamping member disposed on the outside of the outer hose member, and overlying the inner end of the inner hose member, and with a second clamping member also disposed on the outside of the outer hose member but spaced axially outside of the inner end of the inner hose member.

With these extra features, the inner end of the inner hose member is held between the mating member and the outer end of the outer hose member by the clamping force of the first clamping member. This securely holds the inner hose member in the outer hose member. The part of the inner periphery of the outer end of the outer hose member is brought into contact with the outer periphery of the end of the mating member, thereby sealing the boundary between the outer hose member and the mating member. In other words, the outer hose member is a rubber hose, and accordingly the inner peripheral area of its outer end is adapted to operate as a sealing member. As a result, it is possible to get rid of the sealing member, an other wise independently prepared component.

The outer hose member could include a tubular, axially extending end that can be folded onto the inner periphery of the inner end of the inner hose member and provide a seal in the boundary area between the mating member and the interior surface of the end of the inner hose member.

Thus, the tubular, folding portion provides a seal in the boundary area between the outer periphery of the mating member and interior surface of end of the inner hose member. Consequently, it is possible to obviate an independently prepared component and eliminates a faulty assembly associated with that component. The outer hose and the sealing portion are formed integrally. Accordingly, such an integral construction exhibits a further enhanced sealing property than was achievable by use of a separate sealing member.

In order to further improve the sealing property and the assembly of the present hose, including the tubular foldable sealing portion, it is preferred that the sealing portion include a plurality of ring-shaped projections. Such projections are disposed on the inner periphery in series, and are spaced apart in an axial or lengthwise direction. The projections are adapted to be brought into close contact with the outer periphery of the mating member when properly folded. The folded portion also includes ring-shaped, thin-walled sections disposed between the projections and a thickness smaller than that of the projections.

With the thus modified tubular foldable sealing portion, the second straight tubular portion of the inner hose member is held and sealed between the foldable sealing portion, folded into the outer hose member, and the first straight tubular portion. The foldable sealing portion can be folded starting at either of the ring-shaped thin-walled portions disposed between the projections.

In the present hose including the thus modified tubular foldable sealing portion, the projections and the thin-walled portions are disposed in series in an axially lengthwise direction. Consequently, not only the sealing property can be secured in the boundary area between the foldable sealing portion and the outer periphery of the mating member, but also the mating member can be inserted more easily into the present hose.

The tubular foldable sealing portion can be folded starting at either of the ring-shaped thin-walled portions disposed between the projections. This increases the degree of freedom in the selection of the folding points. Thus, the foldable sealing portion allows one to advantageously cope with the relative fluctuations that can occur in the axially lengthwise dimensions of the outer and inner hose members.

Moreover, the tubular foldable sealing portion extends integrally from the first straight tubular portion of the outer hose member. Therefore, such a construction advantageously improves the assembly operability and reduces manufacturing costs.

In that aspect of the present hose including the sealing member or the tubular foldable sealing portion, it is preferred that the inner hose member further includes an annular extending projection. The first straight tubular portion of the outer hose member includes a regulatory projection, on the inner periphery, which projects in a radial direction and is adapted to face and engage the annular projection of the inner hose member and hold that annular projection between the sealing member, or the foldable sealing portion, and itself.

The annular projection and the regulatory projection hold or constrain the inner hose member in an axial direction. Further, when inserting the mating member into the inner hose member during assembly, the inner hose member is also prevented from displacing axially lengthwise thereby improving assembly.

Furthermore, when the mating member is inserted, the improved hose end construction enhances the holding capability of the hose. Consequently, the present hose exhibits improved sealing there about. Therefore, the present hose further inhibits fuels, such as gasoline, from permeating therefor the seal.

In the present invention having the double bellows-like construction described above, it may be required to enlarge the elongation of the inner hose member at second bellows-like tubular portion in order to improve holding and anti-tearing properties.

In order to enlarge the elongation of the inner hose member at the second bellows-like portion, it is preferred that the corrugation constituting the bellows-like tubular portion has an enlarged height. However, when the corrugation constituting the second bellows-like tubular portion of the inner hose member projects inwardly in the centripetal direction, the cross-sectional area of the passage in the inner hose member is diminished, thereby deteriorating fluid flow through the inner hose member. Accordingly, it is preferred that the corrugation the second bellows-like tubular portion of the inner hose member project in the centrifugal direction.

Namely, it is preferred that the tops or ribs of the second bellows-like tubular portion of the inner hose member are designed to have an outside diameter larger than the inside diameter of the end of the outer hose member, and that the outer periphery of the tops of the second bellows-like tubular portion of the inner hose member project in a centrifugal direction with respect to the inner periphery of the end of the outer hose member.

Generally, it is preferred that the cross-section of the corrugation constituting the bellows-like tubular portion is comprised of component corrugations having a substantially isosceles triangle shape disposed continuously in series. In other words, in the bellows-like tubular portion, the rising slopes are designed to have a dimension from the bottom to the neighboring rib or top which is equal to the dimension of the falling slopes from the rib or top to the neighboring groove or bottom. As a result, there arises a problem in that the increment in the outside, diameter of the inner hose member makes it hard to insert the inner hose member into the outer hose member when the corrugation of the second bellows-like tubular portion of the inner hose member projects in the centrifugal direction.

In order to avoid the problem, it is preferred that the corrugation constituting the second bellows-like tubular portion includes rising slopes whose outside diameter increases from an end to another end of the inner hose member and which have a dimension "L1" from the bottom to the top, and falling slopes whose outside diameter decreases from the end to the other end and which have a dimension "L1" from the bottom to the top, and that the dimension "L1" of the rising slopes is larger than the dimension "L2" of the falling slopes.

With these dimensional features, the outside diameter of the second bellows-like tubular portion of the inner hose member can be designed to be larger at the tops, or ribs, than the inside diameter of the outer hose member at the end, and the outer periphery of the tops of the second bellows-like tubular portion of the inner hose member can project in the centrifugal direction with respect to the inner periphery of the end of the outer hose member. Thus, the corrugation constituting the second bellows-like tubular portion of the inner hose member can project in the centrifugal direction. To put it differently, the corrugation constituting the second bellows-like tubular portion of the inner hose member can project less in the centripetal direction. Thus, the construction of the invention provides a large cross-sectional area for fluid flow through the inner hose member, improves the ability to enlarge the elongation of the inner hose member, and provides for a secure holding capability and an anti-tearing property to the inner hose member. Although the height of the corrugation constituting the second bellows-like tubular portion of the inner hose member is enlarged in the centrifugal direction, the inner hose member can be inserted into the outer hose member with ease by inserting the inner hose member starting at the rising slopes having the larger dimension "L1" because the tops of the second bellows-like tubular portion are likely to fall toward the falling slopes having the smaller dimension "L2."

Moreover, it is preferred that at least one of the second straight tubular portions of the inner hose member includes an engager portion integrally extending from the end, and adapted to cover at least the outer periphery of the outer hose member on an axial end of the outer hose member and engage with the axial end of the outer hose member. With the engager portion, the integrity is improved between the second straight tubular portion of the inner hose member and the first straight tubular portion of the outer hose member. Accordingly, the second straight tubular portion of the inner hose member and the first straight tubular portion of the outer hose member are moved together securely during the assembly, thereby improving the assembly operability.

BRIEF DESCRIPTION OF THE DRAWING

A more complete appreciation of the present invention and many of its advantages will be readily obtained as the same becomes better understood by reference to the following detailed description when considered in connection with the accompanying drawings, all of which forms a part of the disclosure:

FIG. 36 is a cross-sectional view of the inner hose member of the fifteenth embodiment before assembly.

DETAILED DESCRIPTION OF THE PREFERRED EMBODIMENTS

Having generally described the present invention, a further understanding can be obtained by reference to the specific preferred embodiments which are described herein for purposes of illustration only; they are not intended to limit the scope of the appended claims.

First Embodiment

Figure 1:
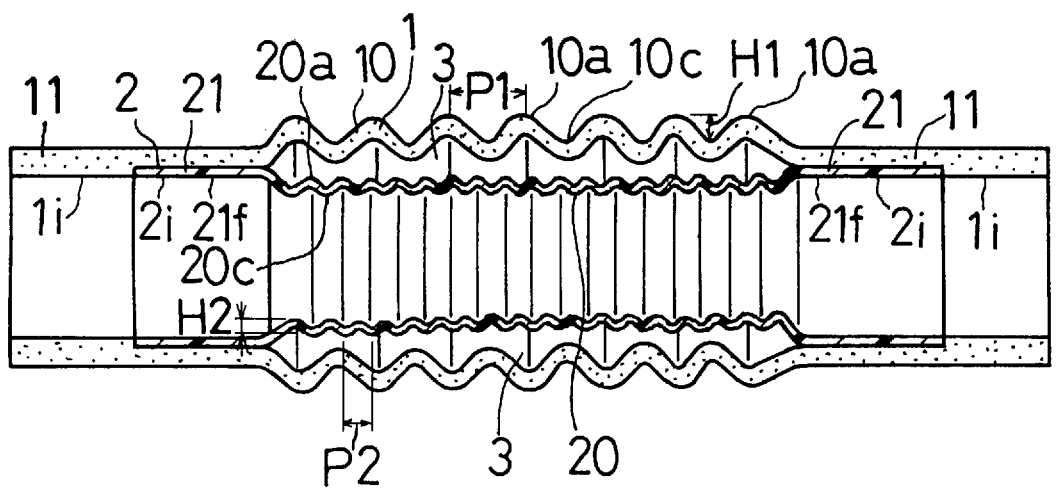
FIG. 1 is a cross-sectional view of a first embodiment of a hose according to the present invention.

The first embodiment of the present hose can be understood with reference to FIG. 1. The hose comprises an outer hose member 1, and an inner hose member 2 disposed in a central hole 1i of the outer hose member 1.

The outer hose member 1 includes a first bellows-like tubular portion 10 disposed in an intermediate or central area and extends axially. First straight, axially extending tubular portions 11 are disposed at each ends. The outer surface of the first bellows-like tubular portion 10 includes tops (ribs) 10a and bottoms (grooves) 10c, both of which are annular and extend around the hose like a ring. In the first bellows-like tubular portion 10, a height "H1" of the corrugation between the tops 10a and the bottoms 10c is designed to be about 5–7 mm, and a pitch "P1" between the neighboring tops 10a is designed to be about 15–20 mm. The first bellows-like tubular portion 10 is designed so that it has an inside diameter and an outside diameter of about 34 mm and 44 mm, respectively.

The outer hose member 1 can be comprised of a mixture of nitrile rubber and polyvinyl chloride (PVC) to provide anti-flammability, anti-wear and anti-oil and similar properties. The outer hose member 1 is formed by mold-forming with a vulcanizing mold, namely it is vulcanized in the mold at a temperature of about 170°–180° C.

The inner hose member 2 includes a second bellows-like portion 20 disposed in an intermediate or central area that also extends in an axial direction. Inner hose is also includes, second straight, axially extending tubular portions 21 disposed at each end. The second bellows-like tubular portion 20 includes annular corrugations having tops (ribs) 20a and bottoms (grooves) 20c. In the second bellows-like tubular portion 20, a height "H2" of the corrugation between the tops 20a and the bottoms 20c is designed to be about 3–5 mm, and a pitch "P2" between the neighboring tops 20a is designed to be about 4–6 mm.

The height "H2" is designed to be smaller than the height "H1," and pitch "P2" is designed to be smaller than the pitch "P1." Before inserting inner hose 2 into outer hose 1, the second bellows-like tubular portion 20 is designed so that it has an inside diameter and an outside diameter of about 32 mm and 34 mm, respectively. The inner periphery of the inner hose member 2 constitutes a passage hole 2i for conveying a fluid such as the gasoline fuels or the like.

As a material for the inner hose member 2, polyamide resin (e.h., nylon 11) is used. This provides a good vapor barrier and the desired flexibility. The inner hose member 2 is preferably formed by blow molding, but other forming techniques could be employed.

The outer hose 1 and the inner hose 2 are formed independently of each other. During assembly, the inner hose 2 is inserted into the outer hose 1 until they are joined integrally at both the first and second straight tubular portions 11 and 21, respectively. This connection can be improved by use of adhesive layers 21f formed in the boundary areas between the inner peripheries of the first straight tubular portions 11 of outer hose 1 and the outer peripheries of the second straight tubular portions 21 of inner hose 2. Following assembly, a tubular air layer 3 is also formed between the second bellows-like tubular portion 20 and the first bellows-like tubular portion 10.

The thus constructed hose is then connected together with a line through which a fluid, for example, fuels such as gasoline, pass. When assembling the hose,the elongation and the flexibility of the bellows-like tubular portions 10 and 20 are utilized, and assembly errors can be absorbed by the bellows-like tubular portions 10 and 20. The vibrations can be also absorbed by the bellows-like tubular portions 10 and 20.

As having been described so far, in the present hose, there is formed the tubular air layer 3 between the second bellows-like tubular portion 20 of the inner hose member 2 and the first bellows-like tubular portion 10 of the outer hose member 1. Accordingly, when the present hose flexes and deforms, the first bellows-like tubular portion 10 and the second bellows-like tubular portion 20 can deform independently of each other, which ensures the designed flexibility.

Further, in the present hose, the outer hose member 1 and the inner hose member 2 constitute the double hose construction, thereby advantageously securing a vapor barrier. In particular, since the inner hose member 2 is formed of the polyamide resin having good barrier ability, the present hose can advantageously inhibit the fluid like the gasoline fuels from permeating through the hoses and evaporating.

Furthermore, since the outer hose 1 is formed of vulcanized rubber, it has such anti-flammability that the inner hose 2 is protected against outside flames.

Moreover, the tubular air layer 3 formed between the inner hose member 2 and the outer hose member 1 also operates as an adiabatic air layer. Accordingly, heat is less likely to transfer from the outside to the inner hose thereby providing further improved adiabatic ability and anti-flammability protection for the inner hose 2.

In addition, in the present hose, the corrugation height "H2" and the pitch "P2" of the second bellows-like tubular portion 20 of the inner hose member 2 are smaller than the corrugation height "H1" and the pitch "P1" of the first bellows-like tubular portion 10 of the outer hose member 1. Such dimensional features of the present hose contribute to reducing the resistance exerted to the passing fluid and to inhibiting turbulent fluid flow from arising when the fluid like the gasoline fuels flows through the passage hole 2i.

Figure 4:
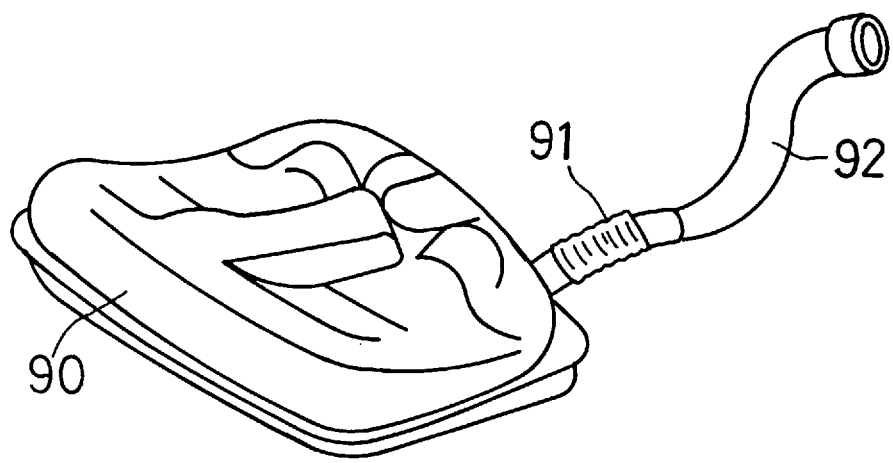
FIG. 4 is a perspective view of an application of the present invention.

FIG. 4 illustrates an application of the present hose to a fuel tank. In FIG. 4, a fuel tank adapted to be installed to a vehicle is designated at 90, a fuel inlet hose corresponding to the present hose is designated at 91, and a fuel inlet pipe is designated at 92.

Second Preferred Embodiment

Figure 2:
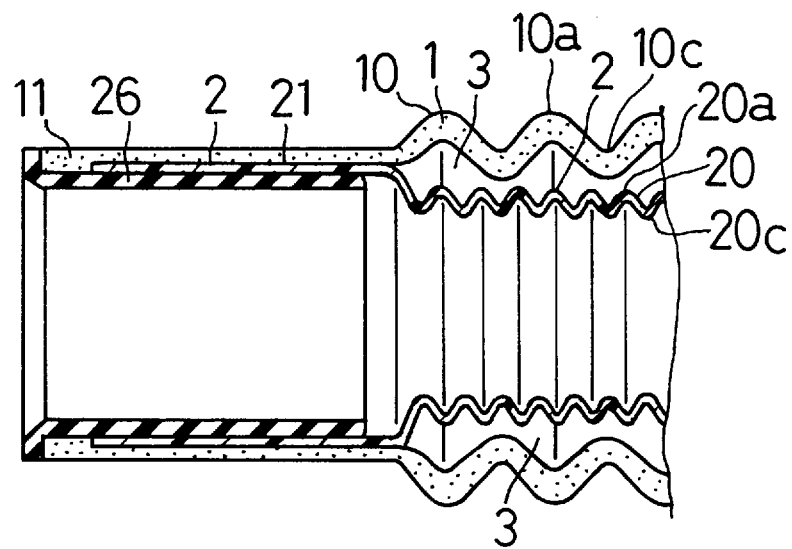
FIG. 2 is a cross-sectional view of one end of a second embodiment of the present invention.
Figure 3:
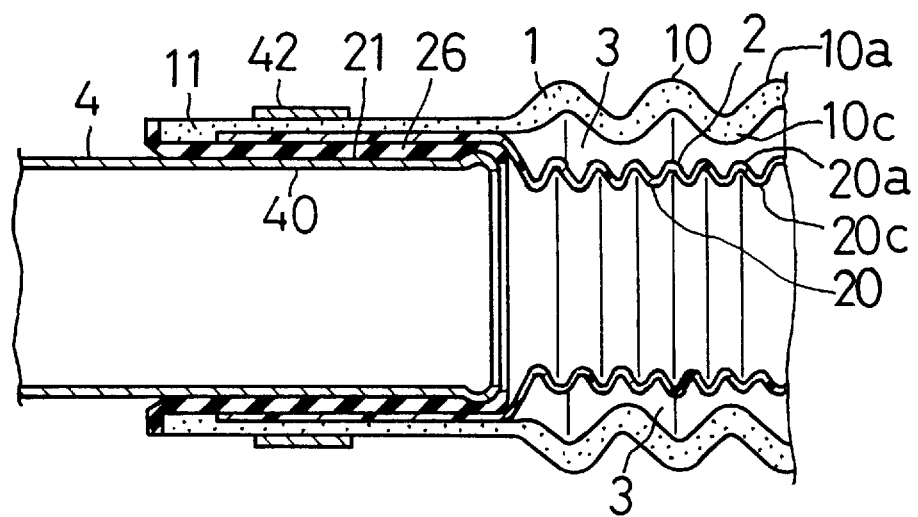
FIG. 3 is cross-sectional view of the second embodiment including a mating pipe inserted therein.

In FIGS. 2 and 3 the invention includes a sealing rubber layer 26 positioned on the inner periphery of the second straight tubular portion 21 of the inner hose member 2. The sealing rubber layer 26 is formed in an elongated tubular shape, and is flexible. Further, layer 26 can be formed of a rubber material having an excellent anti-oil property, for example, nitrile rubber (NBR).

In the construction illustrated in FIG. 3, an end 40 of a mating member 4 is inserted into the second straight tubular portion 21 of the inner hose member 2, and an outer ring-shaped clamping member 42 is installed to clamp the end of the present hose to mating member 4. When inserting the mating member 4 into the inner hose member 2, the sealing rubber layer 26 deforms elastically. Accordingly, mating member 4 can be readily inserted without damaging tubular portion 21.

After completing the insertion, the elasticity of layer 26 securely seals the boundary area between the inner hose 2 and the mating member 4 even if the inner hose 2 formed of polyamide resin is hard relatively. Since the sealing rubber layer 26 produces a reliable seal one can expect that the adhesive layer disposed in the boundary area between the inner hose member 2 and the outer hose member 1, and the adhesive layer disposed in the boundary area between sealing rubber layer 26 and the inner hose member 2 can be omitted.

Third Preferred Embodiment

Figure 5:
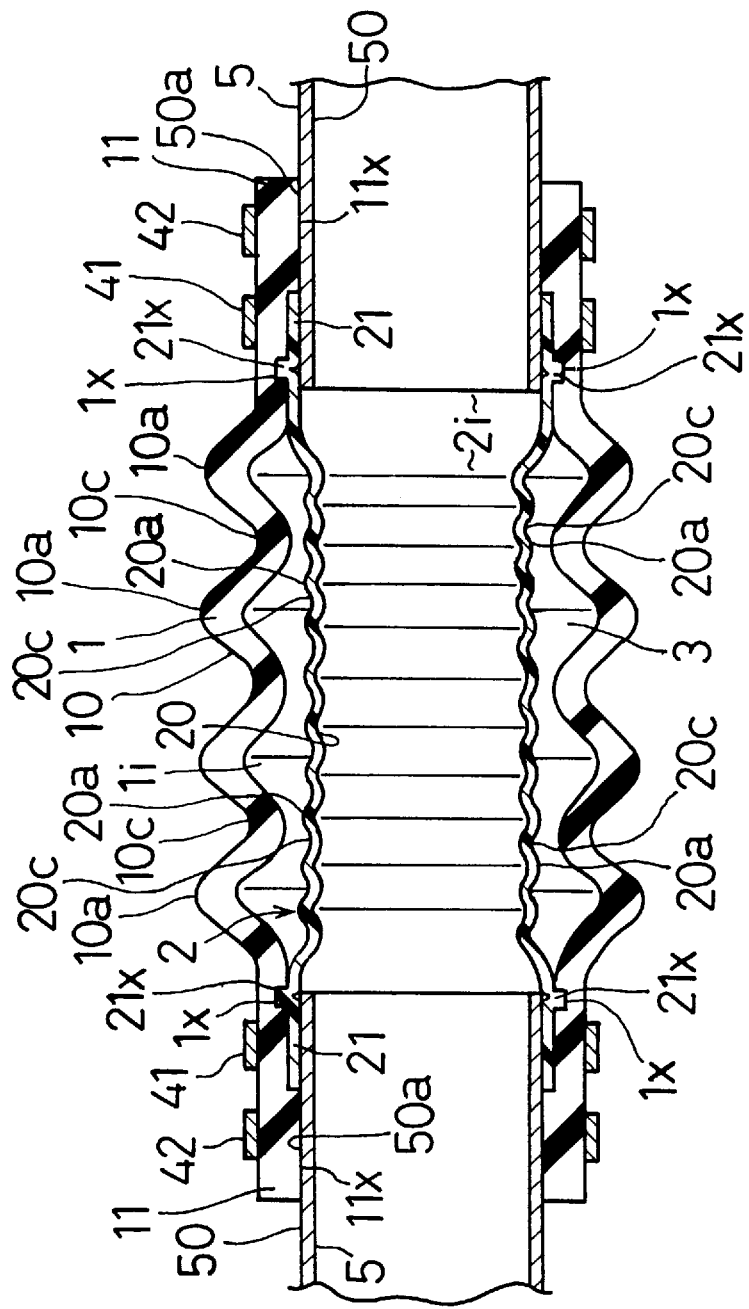
FIG. 5 is a cross-sectional view of a third embodiment of the present invention.

The third embodiment is illustrated in FIG. 5, and comprises an outer hose member 1, and an inner hose member 2 disposed in a central hole 1i of the outer hose member 1.

The outer hose member 1 still includes an intermediate first bellows-like tubular portion 10 and outer end portions 11 having insertion opening 11x. The first bellows-like tubular portion 10 includes annular corrugations with tops 10a and bottoms 10c. The tops 10a are designed to have an outside diameter of about 40–80 mm. The bottoms 10c are designed to have an inside diameter of about 30–70 mm. The neighboring tops 10a are designed to have a pitch of about 10–20 mm. Further, the outer ends 11 include a ring-shaped groove 1x in their inner peripheries adjacent the first bellows-like tubular portion 10.

As a material for the outer hose member 1, a mixture of nitrile rubber and polyvinyl chloride (PVC) is used in view of the anti-flammability, the anti-wear property, the anti-oil property, and the like. The outer hose member 1 is formed by mold-forming with a vulcanizing mold, namely it is vulcanized in the mold at 170°–190° C.

The inner hose member 2 also includes an intermediate second bellows-like portion 20 and inner end portions 21. The second bellows-like tubular portion 20 includes annular corrugations with tops 20a and bottoms 20c. The tops 20a are designed to have an outside diameter of about 20–60 mm. The bottoms 20c are designed to have an inside diameter of about 18–58 mm. The neighboring tops 20a are designed to have a pitch of about 1–5 mm. Further, the inner ends 21 include a ring-shaped projection 21x on their outer peripheries. The inner periphery of the inner hose member 2 constitutes a passage hole 2i adapted for conveying a fluid such as gasoline fuels or the like.

As a material for the inner hose member 2, polyamide resin (e.g., nylon 11) is used in view of its barrier ability, flexibility, and such properties. The inner hose member 2 is formed by blow molding.

In this embodiment, the outer hose member 1 and the inner hose member 2 are formed independently of each other. Then, as can be appreciated from FIG. 5, the ring-shaped grooves 1x of the outer hose member 1 are engaged with the ring-shaped projections 21x of the inner hose member 2, and the inner hose member 2 is inserted into the insertion opening 11x of the outer ends 11 of the outer hose member 1. Thereafter, ring-shaped first and second clamping members 41 and 42, respectively, are clamped around the outer peripheries of each outer end 11. The inner ends 21 of the inner hose 2 are thereby held between ends 50 of mating members 5 and outer ends 11 of the outer hose 1 and retained by the clamping forces of the first clamping members 41. The inner periphery of each outer end 11 of the outer hose 1 are in close mating contact with the outer periphery 50a of each mating member 50 and the clamping forces of the second clamping members 42 assure sealing of the boundary areas between the mating members 5 and the hose.

In addition, a tubular air layer 3 is formed between the second bellows-like tubular portion 20 and the first bellows-like tubular portion 10.

As described so far, the clamping forces of the first clamping members 41 hold the inner ends 21 of inner hose 2 between the interior ends 50 of the mating members 5 and ends 11 of the outer hose 1. This securely retains the inner hose 2 within outer hose 1. The clamping forces of the second clamping members 42 bring the inner periphery of each outer end 11, that lie axially beyond inner hose 2, into close contact with the outer periphery 50a of each mating members 50. Thus, the boundary areas between the outer hose 1 and mating members 5 are reliably sealed. Outer hose 1 is preferably a rubber hose with the inner peripheral areas of the outer ends 11 functioning like a sealing members. As a result, it is possible to omit separate sealing members.

Since the ring-shaped grooves 1x of the outer hose 1 engage the ring-shaped projections 21x of the inner hose 2, the inner hose 2 can be readily positioned in the outer hose 1 and be held therein with an improved retainability. However, the present hose is not limited thereto, and it can do away with the ring-shaped grooves 1x and the ring-shaped projections 21x and employ an adhesive or other securing mechanism.

Fourth Preferred Embodiment

Figure 6:
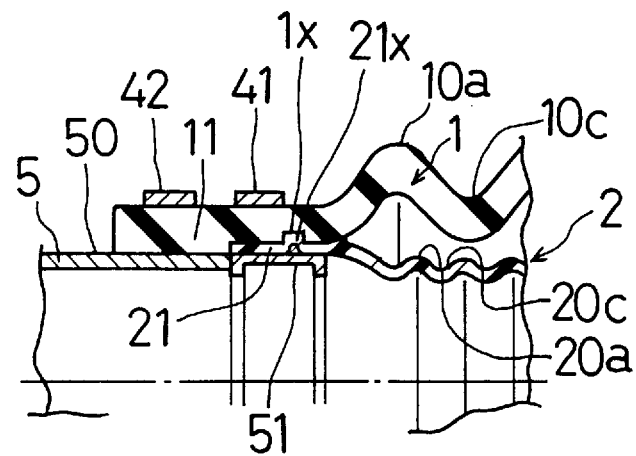
FIG. 6 is a cross-sectional view of a forth embodiment of the present invention.

The fourth embodiment, illustrated in FIG. 6, includes a tubular collar 51, made of metal or resin, that is disposed in the inner end 21 of the inner hose 2. Other than for collar 51, this embodiment has basically a construction that is identical to the third embodiment, thereby producing the same advantageous effects. In particular, collar 51 receives the clamping force of the first clamping member 41 and provides secure sealing between the outer end 11 of outer hose 1 and the inner end 21 of inner hose 2.

Fifth Preferred Embodiment

Figure 7:
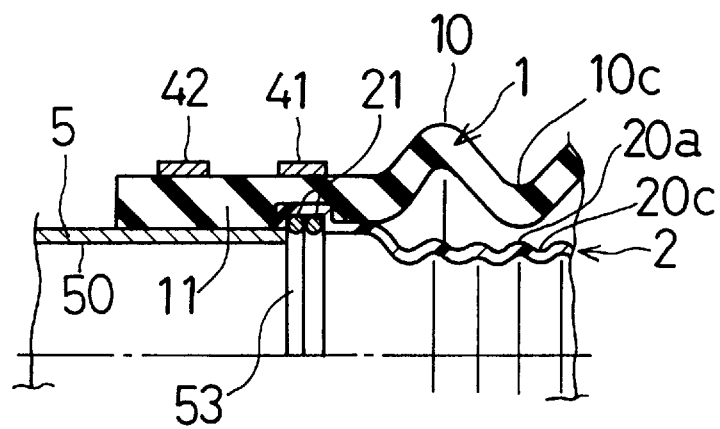
FIG. 7 is a cross-sectional view of a fifth embodiment of the present invention.

The fifth embodiment, illustrated in FIG. 7, also has basically a construction identical with the third embodiment. While it also provides the same advantageous effects, a spring 53 is positioned on the inner periphery of inner end 21. Spring 53 is preferably formed in a letter "C" shape, and exerts a spring force in a radial direction. Clamping member 41 and spring 53 seal the boundary area between the outer end 11 and the inner end 21. Spring force from spring 53 enhances sealing.

Sixth Preferred Embodiment

The sixth embodiment, illustrated in FIG. 8, again basically has an identical construction to that of the third embodiment. In this sixth embodiment, a ring-shaped groove 18x, having a width designated A1, is formed in the inner periphery of one of the outer ends 11 of outer hose 1. A ring-shaped projection 28x, and a stopper projection 28y, also having a width A1, extend radially outwardly from one of the inner ends 21 of inner hose 2. Another ring-shaped groove 19x is formed in the inner periphery of the other outer ends 11 of outer hose 1. Another ring-shaped projection 29x, and a stopper projection 29y, extend radially outwardly from the other inner end 21 of inner hose 2. Groove 19x, projection 29x and stopper 29y have a width A2. In the present hose, the "A1" dimension is designed to be larger than "A2."

Figure 8:
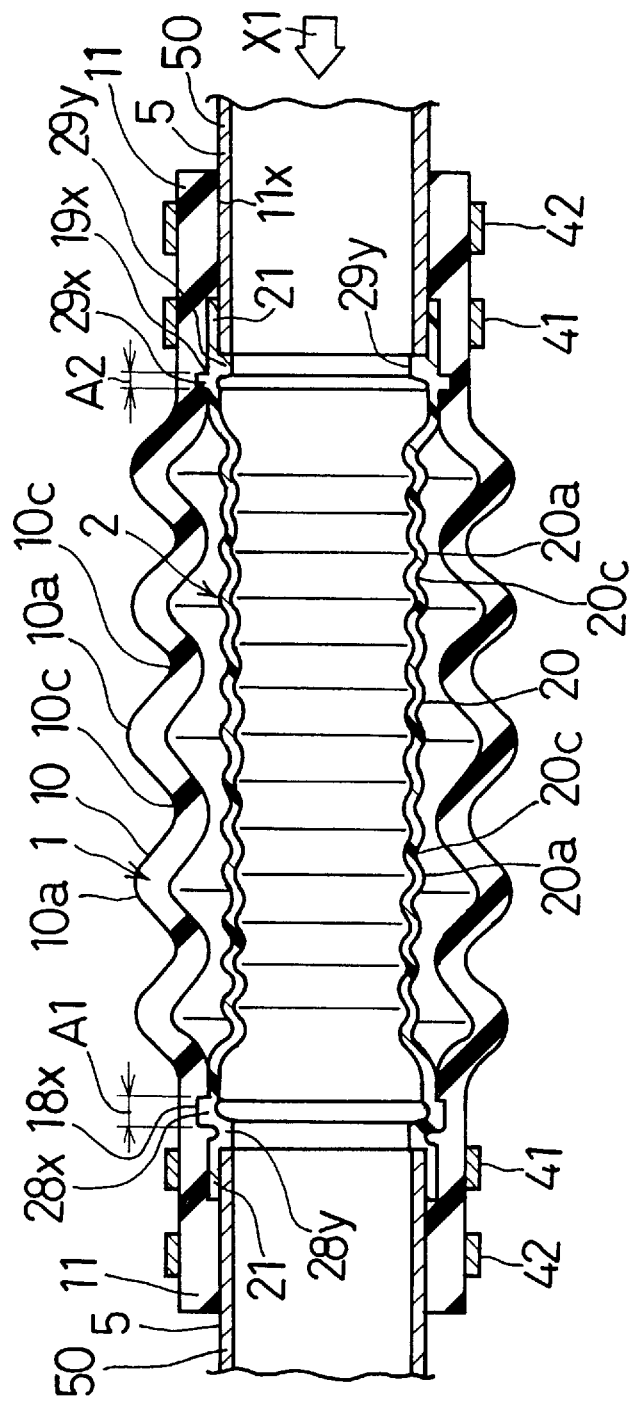
FIG. 8 is a cross-sectional view of a sixth embodiment of the present invention.

When assembling the present hose, the inner hose 2 is inserted into opening 11x of the outer hose 1 in a direction designated by arrow "X1" in FIG. 8. As insertion proceeds, the ring-shaped projection 28x of the inner hose 2 first faces the ring-shaped groove 19x of the outer hose 1. Since width "A1" is larger than "A2", projection 28x with a larger width will not fit into groove 19x which has a smaller width. Rather, projection 28x passes smoothly over groove 19x. When connecting the mating members 5, their axial end surfaces contact the stopper projections 28y and 29y, at either end, respectively, and thus position the mating members 5.

Figure 9:
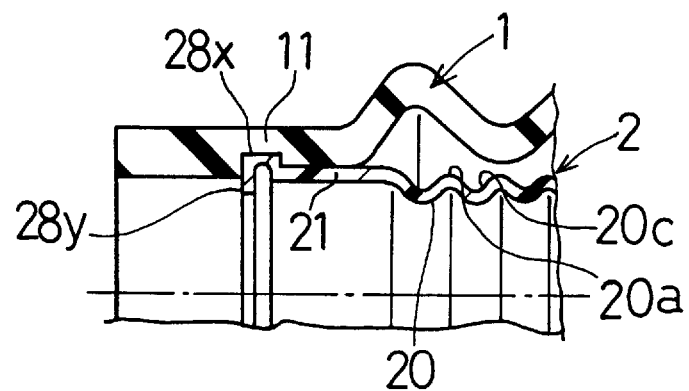
FIG. 9 is an enlarged cross-sectional view of a portion the sixth embodiment.
Figure 10:
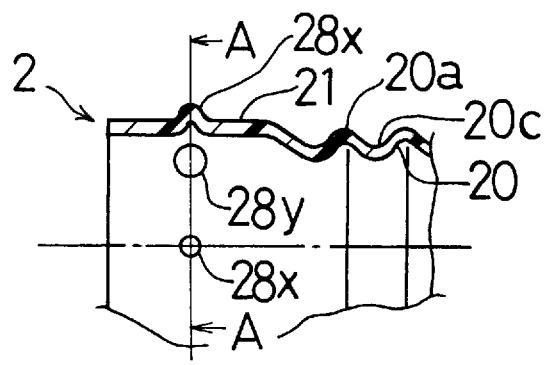
FIG. 10 is a cross-sectional view of part of the inner hose of the sixth embodiment of the present hose.
Figure 11:
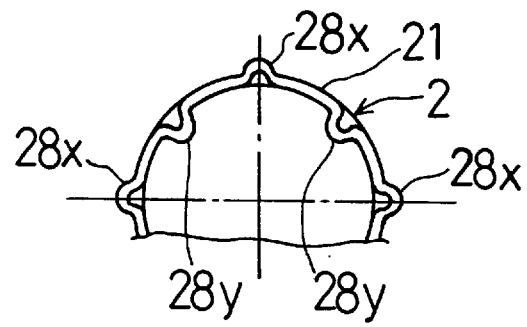
FIG. 11 is a cross-sectional view taken along line "11"—"11" of FIG. 10.

A modified form of this hose is illustrated in FIG. 9. Here, the stopper projection 28y can be formed with an inwardly projecting ring-shaped tongue shape or an outwardly projection 28x. Further, a plurality of such ring-shaped projections 28x and the stopper projection 28y can be formed as illustrated in FIGS. 10 and 11. They can be disposed intermittently and in a spaced apart manner about the circumference of the hose 2.

Seventh Preferred Embodiment

Figure 12:
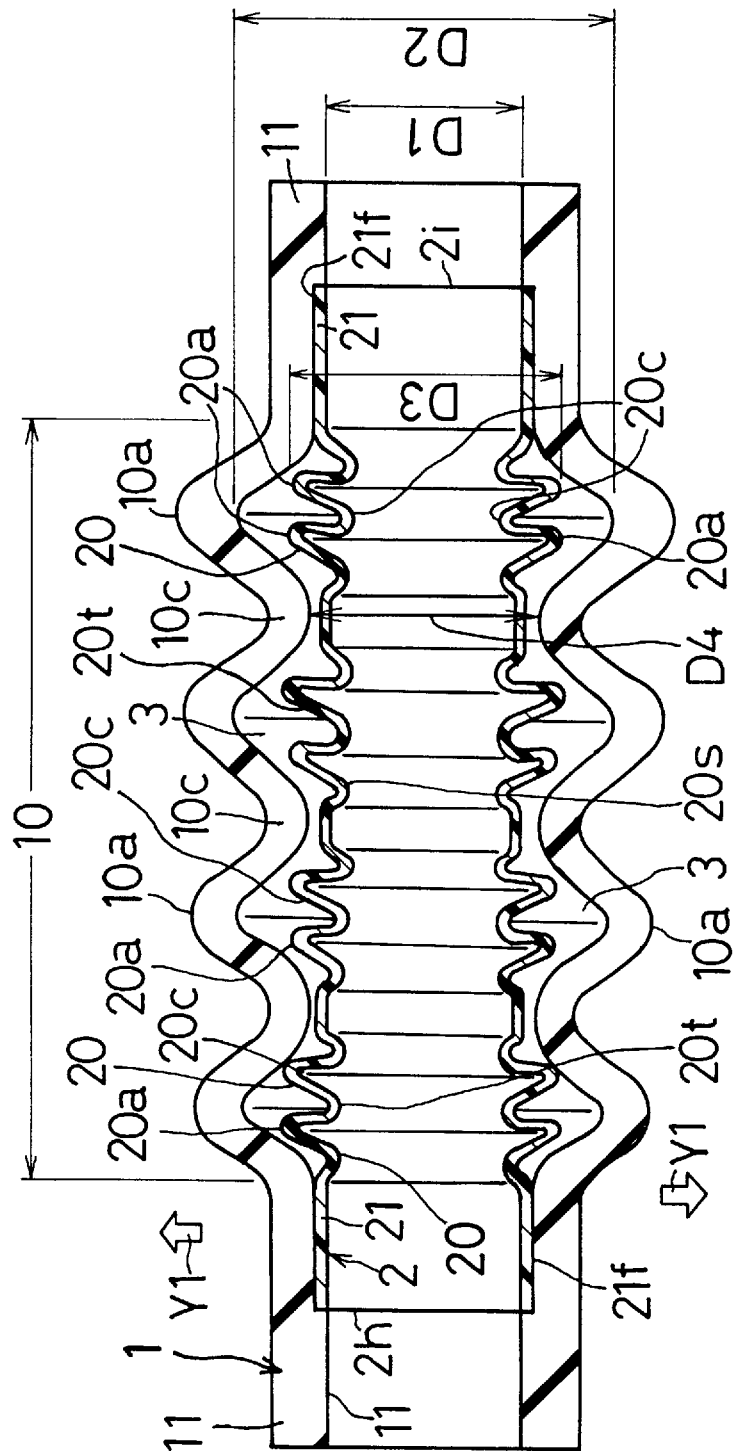
FIG. 12 is a cross-sectional view of a seventh embodiment of a hose according to the present invention.

The seventh embodiment, illustrated in FIG. 12, comprises an outer hose 1, and an inner hose 2 which is disposed in a central hole 1i of outer hose 1.

Outer hose 1 has a bellows-like tubular portion 10 formed in an intermediate area along the axial direction of the hose, and straight tubular portions 11 disposed at each end. Tubular portion 10 includes an exterior bellow surface with annular tops or ribs 10a and bottoms or grooves 10c. As illustrated in FIG. 12, an inside diameter of the straight tubular portions 11 are designated at "D1," and the inside diameter of the top or rib portions 10a is designated at "D2," while the inside diameter of the bottom or groove areas 10c is designated at "D4."

The outer hose 1 is preferably formed from a mixture of nitrile rubber and polyvinyl chloride (PVC) to provide suitable anti-flammability, anti-wear and anti-oil properties. The outer hose 1 is formed by molding and is preferably vulcanized in the mold at temperatures about 170°–180° C.

The inner hose 2 includes a second, intermediate bellows-like portion 20 and a second straight tubular portion 21 disposed at each end. The second bellows-like tubular portion 20 includes annular tops or ribs 20a and bottoms or grooves 20c. An outside diameter of ribs 20a is designated at "D3". The dimension "D3" is designed to be larger than "D1" and "D4," but smaller than "D2." As a result, as illustrated in FIG. 12, ribs 20a project with respect to the inner peripheries of the grooves 10c, e.g., in the direction of the arrow "Y1". Further, the ribs 20a overlie the first bellows-like tubular portion 10 of the outer hose member 1 in a centrifugal direction, e.g., in the direction of the arrow "Y1".

Inner hose 2 is preferably made from polyamide resin (e.g., nylon 11) to provide the desired barrier, flexibility, and other performance characteristics. The inner hose 2 can be formed by blow molding techniques, among other production approaches.

Figure 13:
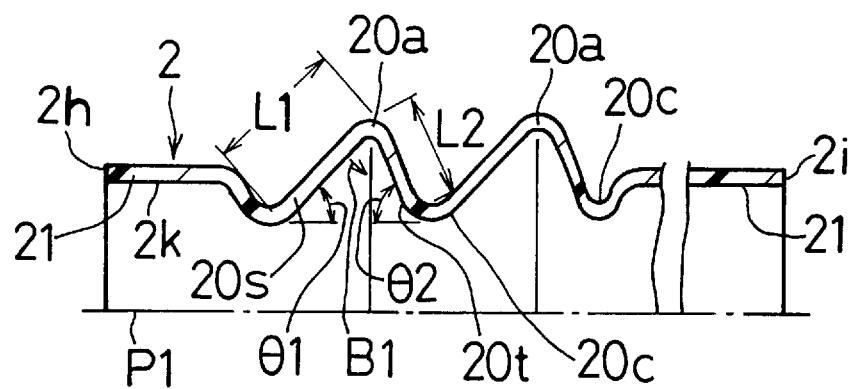
FIG. 13 is a cross-sectional view of part of the inner hose member of the seventh embodiment before assembly.

FIG. 13 illustrates an enlarged cross-sectional view of the inner hose 2. The corrugation constituting the second bellows-like tubular portion 20 includes rising slopes 20s whose outside diameter increase from an end 2h to another end 2i hose, and falling slopes 20t whose outside diameter decreases from the end 2h to the other end 2i. The rising slopes 20s have a dimension "L1" from the bottom to the top, and the falling slopes 20t have a dimension "L2" from the bottom to the top. In the present hose, "L1" is designed to be larger than "L2," (i.e., L1>L2).

Hence, when no external force acts on inner hose 2, an inclining angle "θ1" of the rising slopes 20s, with respect to the axial center line "P1" of the inner hose 2, is designed to be smaller than an inclining angle "θ2" of the falling slopes 20t with respect to the axial center line "P1," (i.e., θ1<θ2). For example, in the present invention, angle "θ1" is designed to be about 50° to 80°, and angle "θ2" is designed to be about 60° to 90°. In the second-bellows like tubular portion 20 having these dimensional features, the rising slopes 20s are likely to fall in the direction of the arrow "B1" when external forces act on the rising slopes 20s on the side of the end 2h.

When assembling the present hose, the outer hose 1 and the inner hose 2 are independently formed. Then, the inner hose 2 is inserted into the outer hose 1 from end 2h. As aforementioned, the outside diameter "D3" of ribs 20a is larger than the inside diameter "D1", of the first straight tubular portion 11c, and of the inside diameter of "D4" of grooves 10c. Even in view of this dimensional relationship, one might fear that it is difficult to insert the inner hose 2 into the outer hose 1 because ribs 20a contact the outer hose 1.

In the present hose, however, the dimension "L1" of the rising slopes 20s is larger than the dimension "L2" of the falling slopes 20t, and the inclining angle "θ1" of the rising slopes 20s is smaller than the inclining angle "θ2" of the falling slopes 20t. Therefore, the rising slopes 20s constituting the corrugation of the second bellows-like tubular portion 20 are likely to fall in the direction of the arrow "B1", thereby enabling the inner hose 2 to be readily inserted into the outer hose 1.

In addition, the outer hose 1 and the inner hose 2 are integrally joined at the straight tubular portions 11 and 21 by adhesive layers 21f positioned therebetween. Once the inner hose is properly inserted into outer hose 1, a tubular air layer 3 is developed between bellows-like tubular portions 20 and 10.

As described previously, outside diameter "D3" of the ribs 20a is larger than the inside diameter "D1" of the first straight tubular portions 11. Accordingly, the outer peripheries of the ribs 20a lie outwardly of the inner peripheries of the first straight tubular portions 11 and the inner peripheries of the bottoms 10c, D4 lie in a centrifugal direction, e.g., in the direction of the arrow "Y1".

The bellows-like tubular portion 20 can be projected greatly in the centrifugal direction, thereby securing the elongation of the inner hose 2. This assists in developing anti-coming-off and anti-tearing properties of the inner hose 2. Additionally, since the inner hose 2 can be elongated, the corrugation constituting the second bellows-like tubular portion 20 can be projected less in the centripetal direction. Hence, the inner hose member 2 can be securely provided with the cross-sectional area for fluid passage.

Because the dimension "L1" of the rising slopes 20s is larger than "L2" of the falling slopes 20t, and since angle "θ1" of the rising slopes 20s is smaller than angle "θ2" of the falling slopes 20t, the rising slopes 20s are likely to fall toward falling slopes 20t, thereby enabling inner hose 2 to be easily inserted into outer hose 1. These dimensional features allow the height of the corrugations in bellows-like tubular portion 20 to enlarge in the centrifugal direction without adversely affecting the insertability of the inner hose 2 into the outer hose 1.

Eighth Preferred Embodiment

Figure 14:
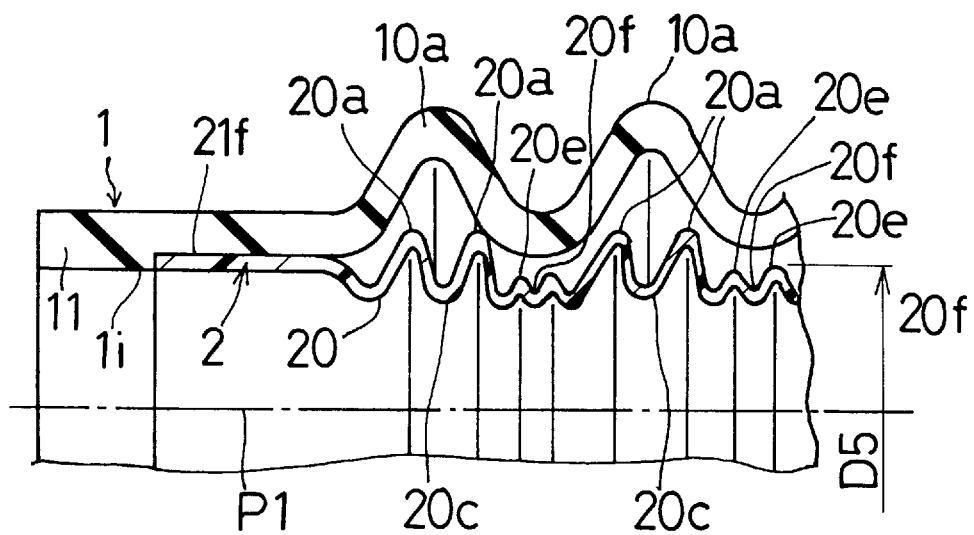
FIG. 14 is cross-sectional view of an eighth embodiment of a hose according to the present invention.

Major portions of the eighth embodiment are illustrated in FIG. 14. In addition to the larger ribs 20a and grooves 20c with larger corrugation heights, the second bellows-like tubular portion 20 here includes minor or lower level tops or ribs 20e and lower bottoms or grooves 20f having a smaller corrugation height. An outside diameter "D5" of the lower ribs 20e is designed to be smaller than the inside diameter "D1" of the first straight tubular portion 11 and the inside diameter "D4" of the grooves 10c.

Ninth Preferred Embodiment

Figure 15:
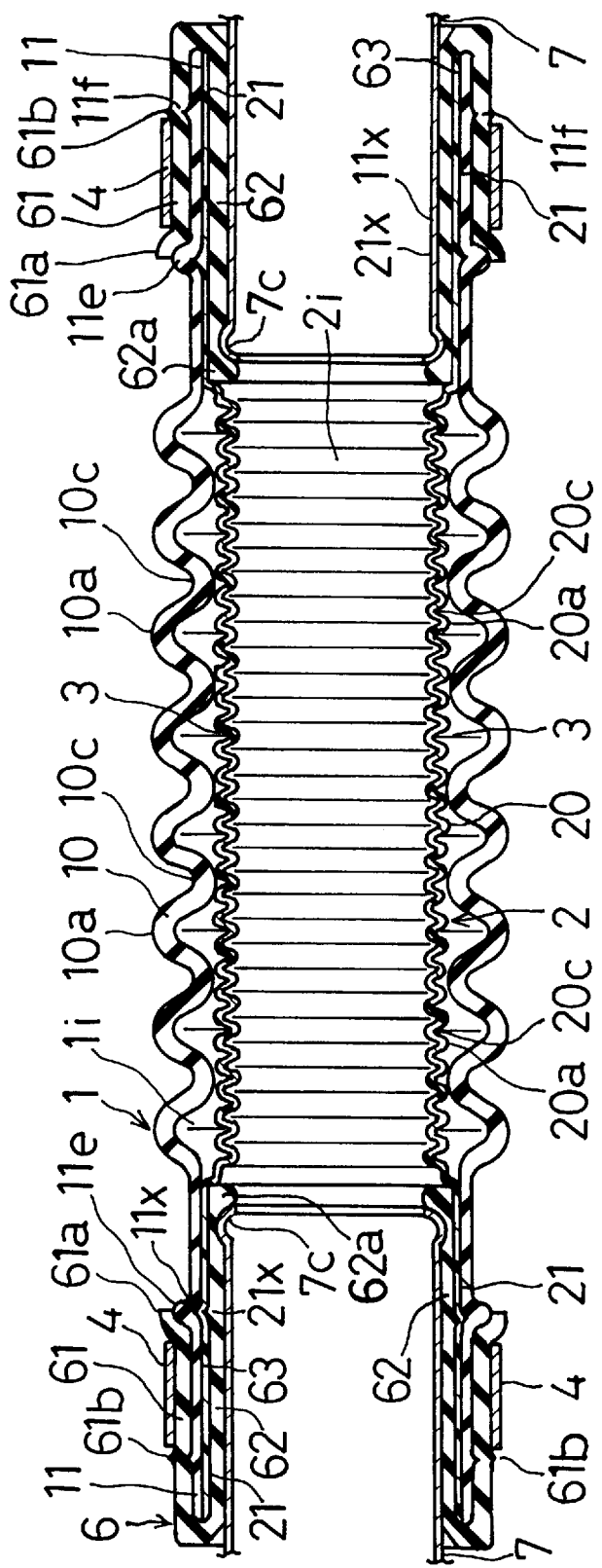
FIG. 15 is a cross-sectional view of a ninth embodiment of a hose according to the present invention.
Figure 16:
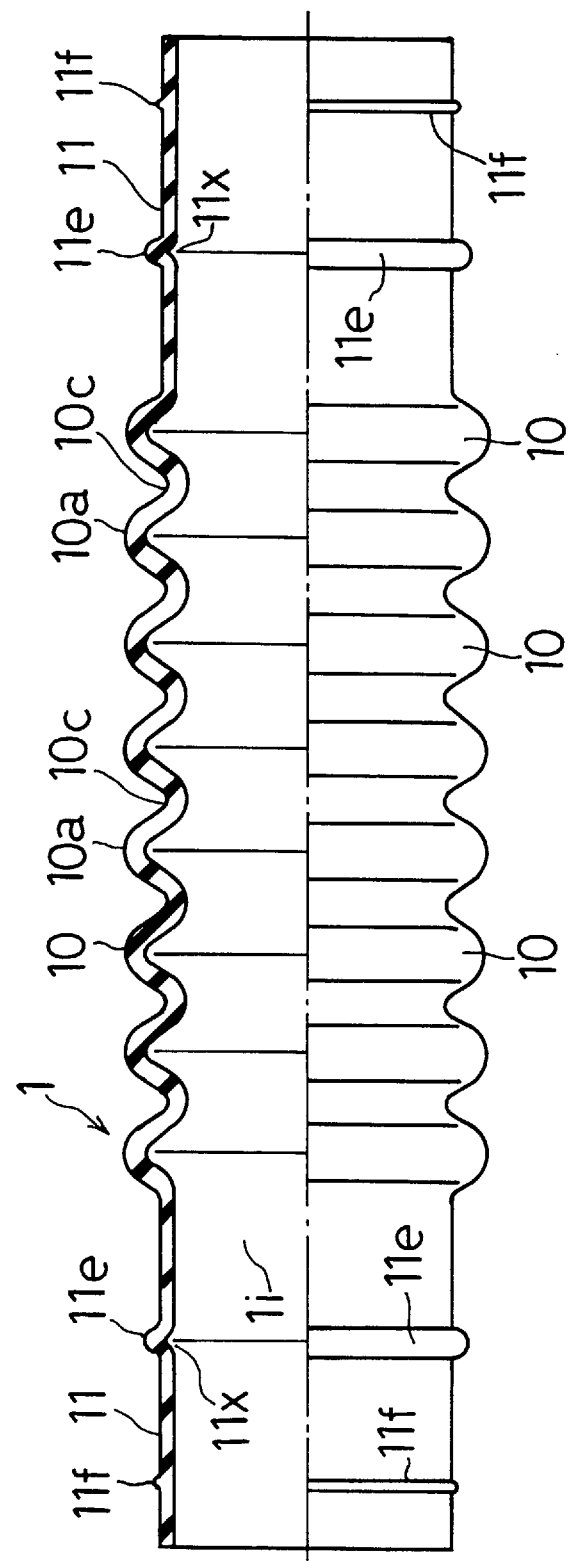
FIG. 16 is a side elevational view, partly in section of the outer hose member of the ninth embodiment.
Figure 17:
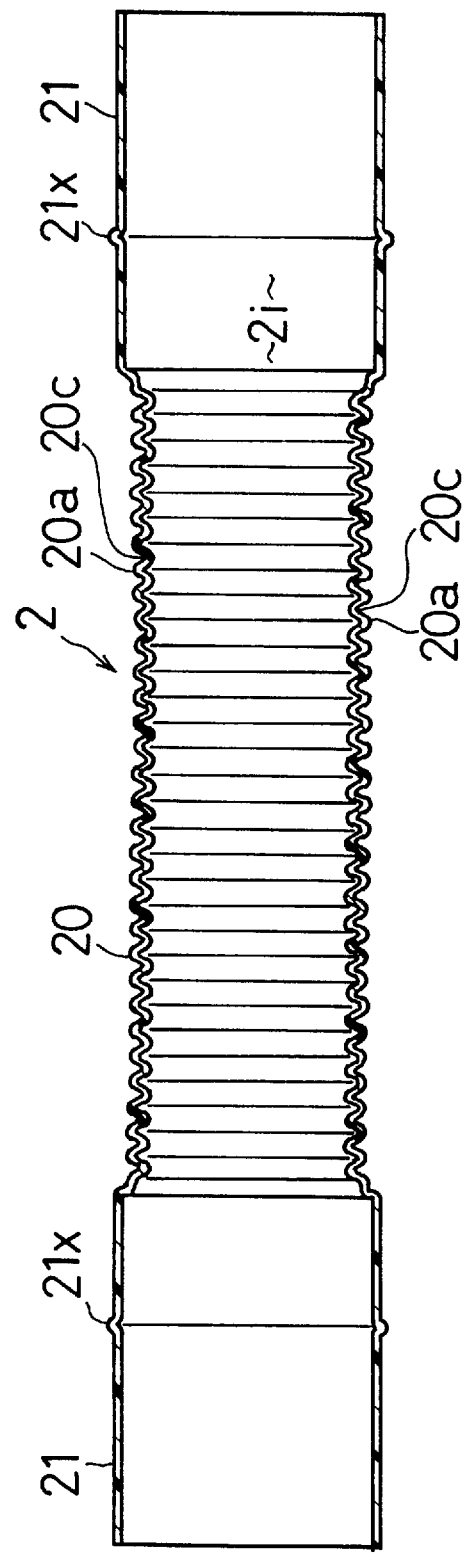
FIG. 17 is a cross-sectional view of the inner hose member of the ninth embodiment.
Figure 18:
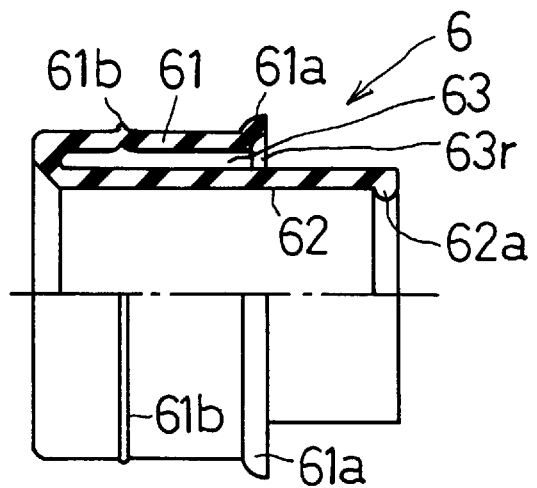
FIG. 18 is a side view with part shown in section, of an end sealing member.

The ninth embodiment of the present invention is best understood with reference to FIGS. 15 through 18. FIG. 15 illustrates a cross-sectional view of the hose after assembly. FIG. 16 illustrates the outer hose member before assembly, FIG. 17 illustrates the inner hose member before assembly and FIG. 18 illustrates a sealing member before assembly.

As illustrated in FIG. 15, the hose comprises an outer hose 1, an inner hose 2 disposed in a central hole 1i of the outer hose 1, and sealing members 6 disposed at the ends.

The outer hose 1 includes a first, intermediate bellows-like tubular portion 10 extending axially, and first straight, axially extending, tubular portions 11 disposed at each end. Bellows-like tubular portion 10 includes annular tops or ribs 10a and bottoms or grooves 10c. A corrugation height of the bellows-like tubular portion 10 is designed to be about 7.5–10 mm. The thickness of the peripheral wall of the outer hose 1 is preferably about 2–4 mm. Further, a ring-shaped major projection 11e and a ring-shaped minor projection 11f are formed on the outer periphery of each tubular portion 11. Furthermore, the major projection 11e is provided with a ring-shaped groove 11x in the inner periphery.

The outer hose 1 is comprised of a mixture of nitrile rubber and polyvinyl chloride (PVC) to provide the anti-flammability, anti-wear and anti-oil properties. Also, it is preferred to form the outer hose 1 by injection molding followed by vulcanization.

The inner hose 2 includes its own bellows-like portion 20 disposed in an intermediate area and which extends axially lengthwise. The inner hose 2 also includes straight, axially extending, tubular portions 21 disposed at each end. A ring-shaped projection 21x is formed on the outer periphery of the second straight tubular portions 21. The outside diameter of the second straight tubular portions 21 is designed to be substantially equal to the inside diameter of the first straight tubular portions 11. Furthermore, the second bellows-like tubular portion 20 includes tops or ribs 20a and bottoms or grooves 20c, both of which extend like a ring.

The pitch between the neighboring ribs 20a of the inner hose 2 is designed to be smaller than the pitch between the neighboring tops 10a of the outer hose 1. A corrugation height of the bellows-like portion of the second bellows-like tubular portion 21 is designed to be about 3–5 mm, and accordingly, is smaller than the corrugation height of the bellows-like portion of the first bellows-like tubular portion 10. Further, as can be appreciated from FIG. 17, an outside diameter of the ribs 20a is designed to be smaller than an outside diameter of the second straight tubular portions 21. The inner hose 2 having these dimensional features advantageously achieves the desired flexibility for the hose, and the dimensional features advantageously inhibit the inner hose 2 from interfering with the outer hose 1 when the assembled hose is bent.

The inner periphery of the inner hose 2 constitutes a passage hole 2i adapted for conveying a fluid such as the fuels, for example gasoline, or the like. A thickness of the peripheral wall of the inner hose 2 is designed to be about 0.5–1.0 mm.

The inner hose 2 is comprised of polyamide resin (e.g., nylon 11, nylon 6, nylon 12, or the like) and used to provide the desired barrier ability, flexibility, and other characteristics. The inner hose 2 can be formed by blow molding, injection blow molding, extrusion blow molding, or other such processes.

As illustrated in FIGS. 15 and 18, the sealing member 6 includes a ring-shaped outer sealing portion 61, a ring-shaped inner sealing portion 62, extending integrally from the outer sealing portion 61, and a ring-shaped sealing groove 63 having an annular-shaped opening 63r as shown in FIG. 18. The outer sealing portion 61 has a ring-shaped major projection 61a, and a ring-shaped minor projection 61b provided on the outer periphery. The inner sealing portion 62 has a stopper projection 62a formed on the inner periphery. The sealing member 6 can be formed by injecting a mixture of nitrile rubber (NBR) and polyvinyl chloride (PVC), followed by vulcanization.

In the sealing member 6, an inside diameter of the outer sealing member 61 is designed to be substantially equal to the outside diameter of the first straight tubular portions 11 of the outer hose 1. An outside diameter of the inner sealing member 62 is designed to be substantially equal to the inside diameter of the second straight tubular portions 21 of the inner hose member 2.

The outer hose 1, inner hose 2, and sealing member 6 are each formed independently of one another. Then, the first straight tubular portions 11 of the outer hose 1 and the second straight tubular portions 21 of the inner hose 2 are superimposed with respect to each other, and they are engaged with the ring-shaped sealing groove 63 of the sealing members 6. When engaged, the projections 21x of the inner hose 2 engage grooves 11x of the outer hose 1, thereby positioning the inner hose 2 in the outer hose 1. Further, as can be appreciated from FIG. 15, mating members, e.g., mating pipes 7, have a ring-shaped end 7c that will expand the diameter of the hose so that when they are inserted into and in engagement with the interior periphery of the inner sealing portions 62 of the sealing members 6. Thereafter, the sealing members 6 are fastened to the first straight tubular portions 11 with the outer hose member 1 with clamping members 4 placed externally around the outer peripheries of the sealing members 6. The stopper projections 62a of the sealing member 6 can operate as a stopper against the mating pipes 7 being inserted.

When assembled, as can be understood from FIG. 15, the present hose is sealed in the following boundary areas: (1) the boundary area between the inner peripheries of the second straight tubular portions 21 and the inner sealing portions 62 of the sealing members 6; (2) the boundary area between the second straight tubular portions 21 and the first straight tubular portions 11 of the outer hose member 1; and (3) the boundary area between the first straight tubular portions 11 of the outer hose member 1 and the outer sealing portions 61 of the sealing members 6, and the boundary area between the outer peripheries of the meting pipes 7 and the inner sealing portions 62 of the sealing member 6. Thus, the fluid, like gasoline or other fuels, flowing in the assembled hose is inhibited from permeating through the boundary areas.

As described, the present hose includes first straight tubular portions 11 and second straight tubular portions 21 which are interconnected and they are engaged with the ring-shaped sealing grooves 63 of the sealing member 6. Then, mating pipes 7 are inserted into to engage with the inner periphery of the inner sealing portions 62 of the sealing members 6. Thereafter, sealing members 6 are fastened with the clamping members 4. As a result, the present hose is sealed securely in the boundary areas between mating parts, thereby inhibiting the permeation of fluid passing therethrough.

Moreover, in the present hose, since the ring-shaped projections 21x are engaged with the ring-shaped grooves 11x, the inner hose 2 can be securely positioned in the outer hose 1.

Tenth Preferred Embodiment

Figure 19:
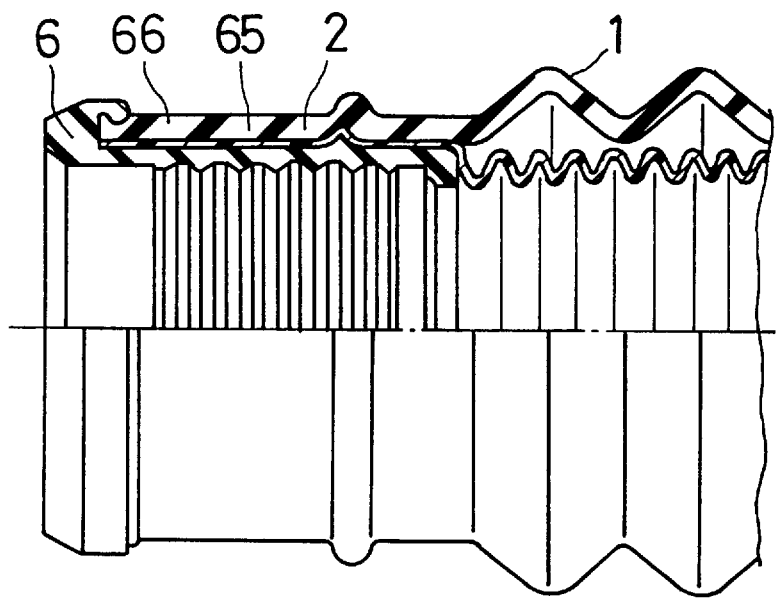
FIG. 19 is a cross-sectional view of a tenth embodiment of the present invention.

The tenth embodiment, illustrated in FIG. 19, is a modified version of the ninth embodiment.

It is preferred that the sealing member 6 include a plurality of ring-shaped sealing projections 65 disposed, in series, in the axial direction on sealing member 6, and thin-walled portions 66 disposed between the neighboring sealing projections 65 and have a thickness smaller than that of sealing projections 65.

With these extra features, the thin-walled portions 66 provide spaces for receiving the deformations of the sealing projections 65 while inserting the mating pipes 7. In the boundary area between the sealing members 6 and the outer peripheries of the mating pipes 7, but it also enables to ready insertion of the mating pipes 7.

Eleventh Preferred Embodiment

Figure 20:
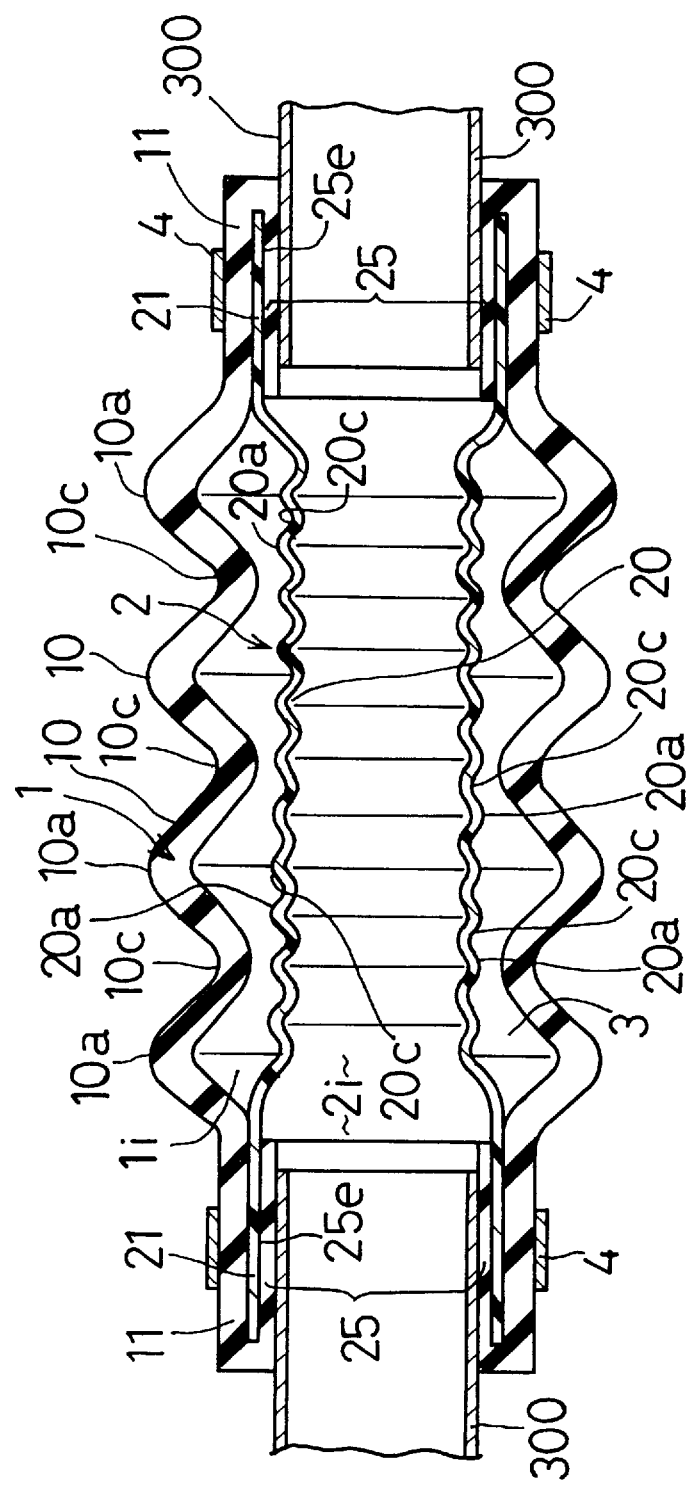
FIG. 20 is a cross-sectional view of an eleventh embodiment of the present invention.
Figure 21:
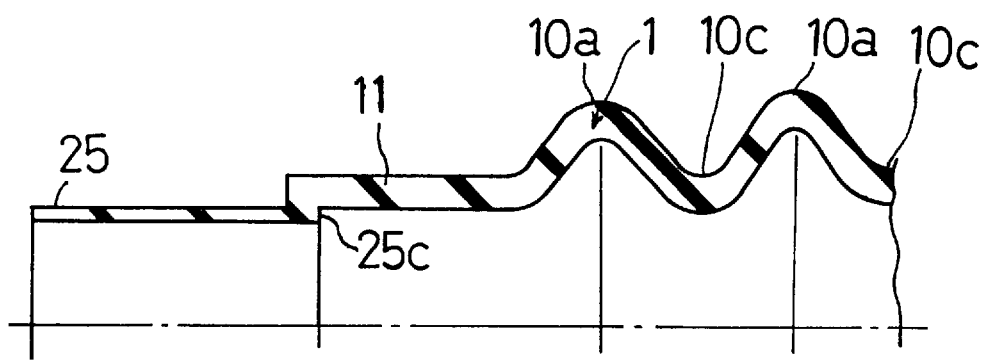
FIG. 21 is a cross-sectional view of part of one end of the eleventh embodiment outer hoses before assembly.

The eleventh embodiment is described with reference to FIGS. 20 and 21 and comprises an outer hose 1, and an inner hose 2 disposed in a central hole 1i of the outer hose member 1.

The outer hose 1 includes a first, intermediate, axially extending bellows-like tubular portion 10, as well as and outer ends 11. In this embodiment, the corrugated portion of the bellows-like tubular portion 10 still includes tops or ribs 10a and bottoms or grooves 10c, both of which extend like a ring. An outside diameter for ribs 10a is designed to be about 40–80 mm while the inside diameter grooves 10c is designed to be about 30–70 mm. A pitch between the neighboring tops 10a is designed to be about 10–20 mm.

In this embodiment the outer hose 1 is comprised of a mixture of nitrile rubber and polyvinyl chloride (PVC) to provide anti-flammability, anti-wear and anti-oil characteristics. The outer hose 1 is formed by mold-forming techniques with a vulcanizing mold and is vulcanized in the mold at a temperature in the range of about 170°–190° C. The outer hose 1 before assembly is illustrated in FIG. 21 and is comprised of a thin-walled tubular foldable sealing portion 25 at each outer end 11 and extends integrally from the outer ends 11. Portion 25 is provided with a ring-shaped shoulder surface 25c stepping from the outer ends 11.

The inner hose 2 continues to include a second, intermediate, axially extending bellows-like portion 20 and inner ends 21. Bellows-like tubular portion 20 includes ribs 20a and grooves 20c, both of which extend like a ring. An outside diameter for ribs 20a is designed to be about 20–60 mm. An inside diameter for grooves 20c is designed to be about 18–58 mm. A pitch between the neighboring ribs 20a is designed to be smaller than the pitch between the ribs 10a of the outer hose member, e.g., about 1–5 mm. The inner periphery of the inner hose 2 constitutes a passage hole 2i adapted for conveying a fluid such as fuels, gasoline or the like.

As a material for the inner hose 2, polyamide resin (e.g., nylon 11) is used to provide the desired barrier ability of the hoses as well as suitable flexibility. The inner hose 2 is formed by blow molding.

In this embodiment, the outer hose 1 and the inner hose 2 are formed independently of each other. Then, as can be appreciated from FIG. 20, the tubular foldable sealing portions 25 are folded inwardly so as to form ring-shaped spaces 25e, and the inner end 21 of the inner hose member 2 is inserted into the ring-shaped spaces 25e. Thereafter, ring-shaped clamping members 4 are clamped around the outer ends 11 of the outer hose 1. Thus, there is formed a tubular air layer 3 between the second bellows-like tubular portion 20 and the first bellows-like tubular portion 10.

Because the outer hose 1 is provided with thin-walled tubular foldable sealing portions 25 at the outer ends 11 (unfolded as in FIG. 21), and since the foldable sealing portions 25 are folded onto the inner peripheries of the inner ends 21, the foldable sealing portions 25 made of rubber effectively seal the boundary areas between the outer peripheries of mating members 300 and the inner ends 21 when the present hose is connected with the mating members 300.

Furthermore, since the inner ends 21 are enclosed in both of the radially inward and outward directions by the outer ends 11 of the outer hose 1 and the foldable sealing portions 25, the fluid, such as gasoline, will not hardly leak to the outside even if the clamping forces of the clamping members 4 decrease and the fuel might try to escape by going over the inner periphery of the inner hose member 2.

Twelfth Preferred Embodiment

Figure 22:
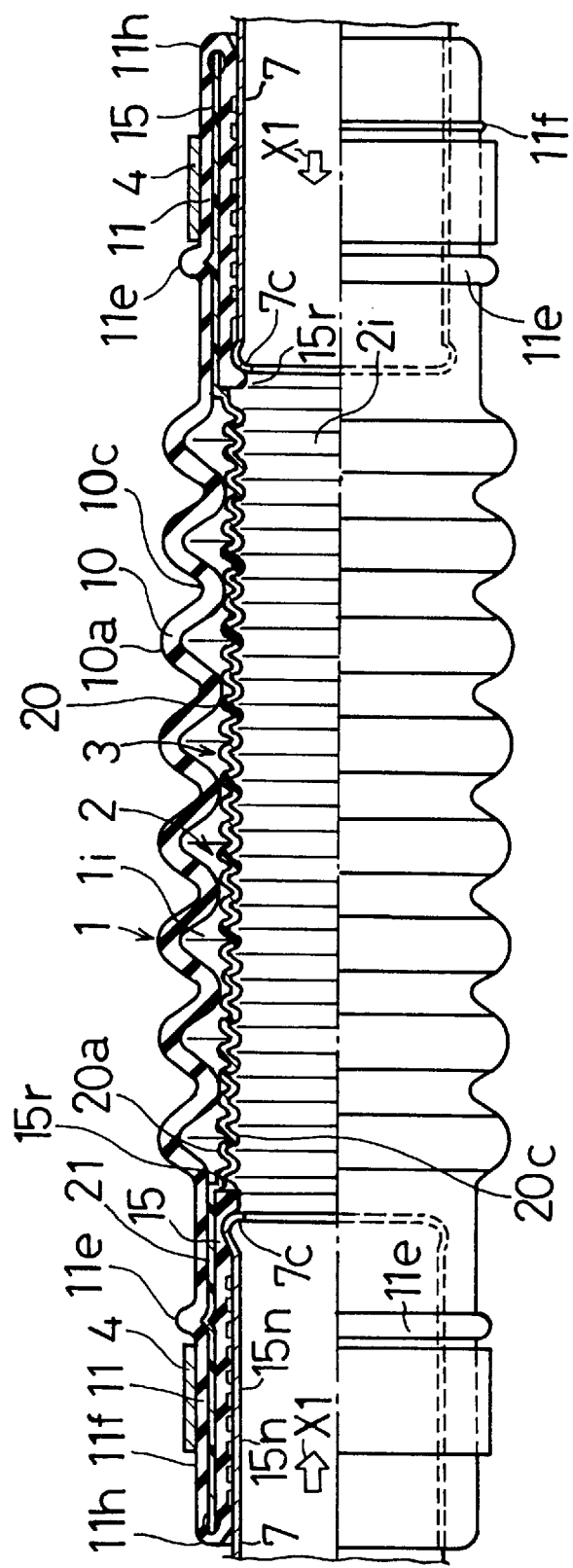
FIG. 22 is a cross-sectional view of a twelfth embodiment of a hose according to the present invention.
Figure 23:
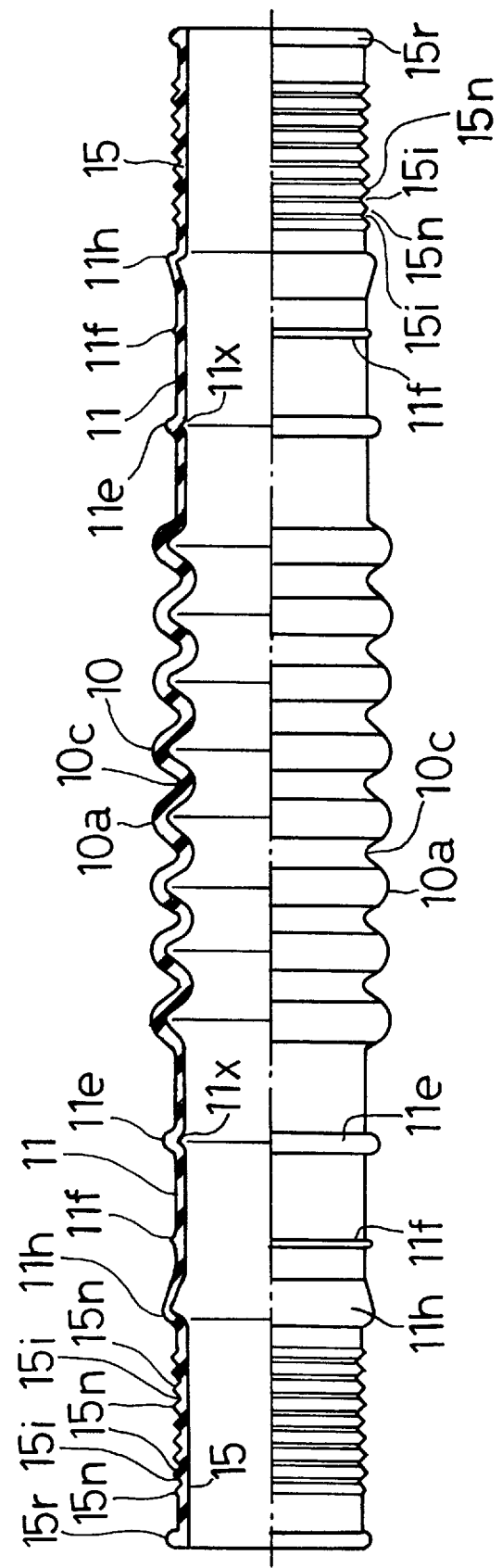
FIG. 23 is a side elevational view, partly in section, of the outer hose of the twelfth embodiment.
Figure 24:
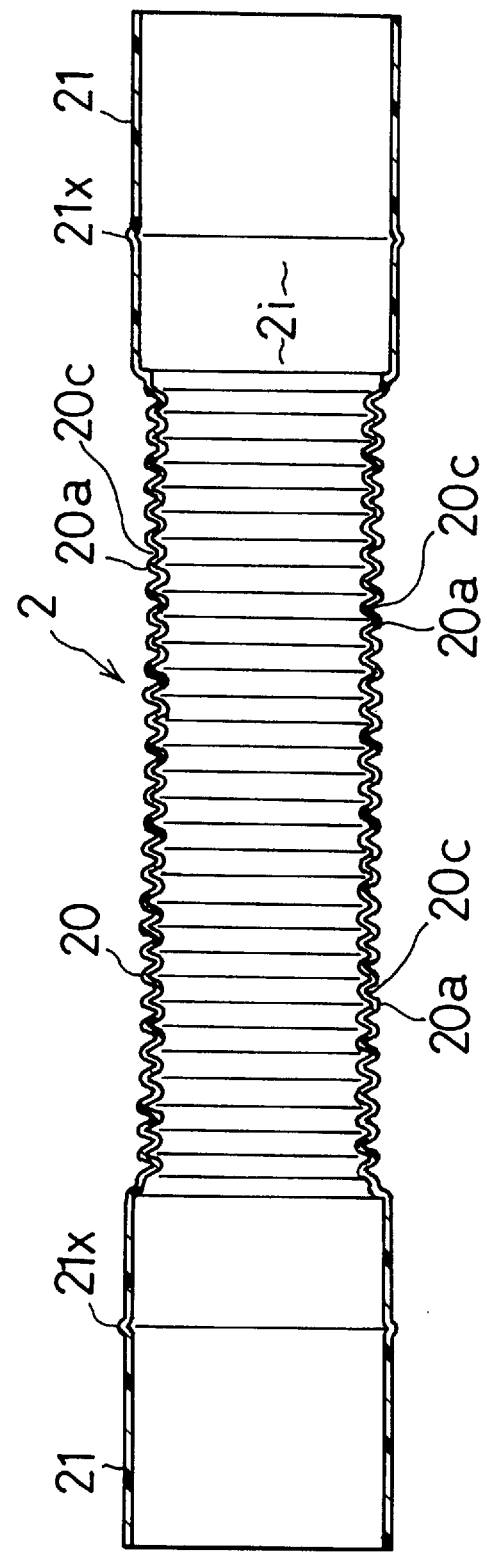
FIG. 24 is a cross-sectional view of the inner hose member of the twelfth embodiment.
Figure 25:
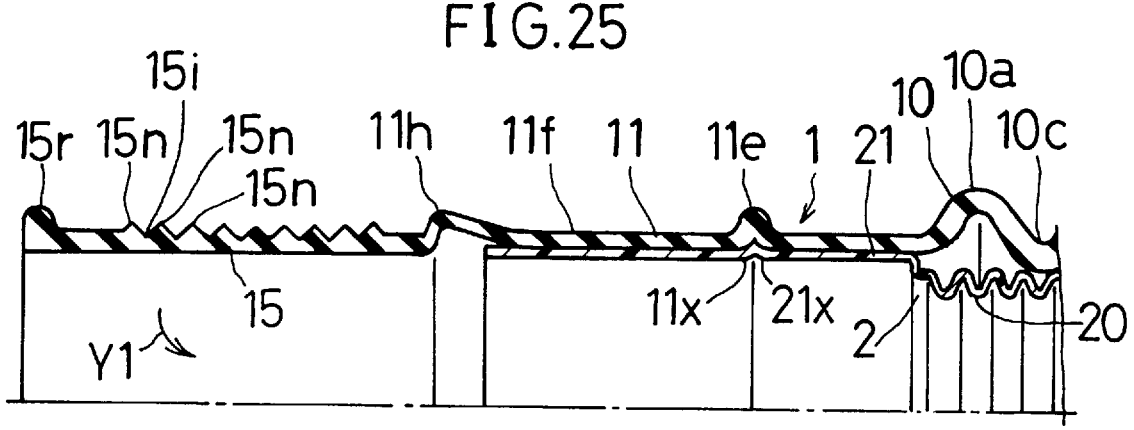
FIG. 25 is a cross-sectional view of one end of the twelfth embodiment during assembly.
Figure 26:
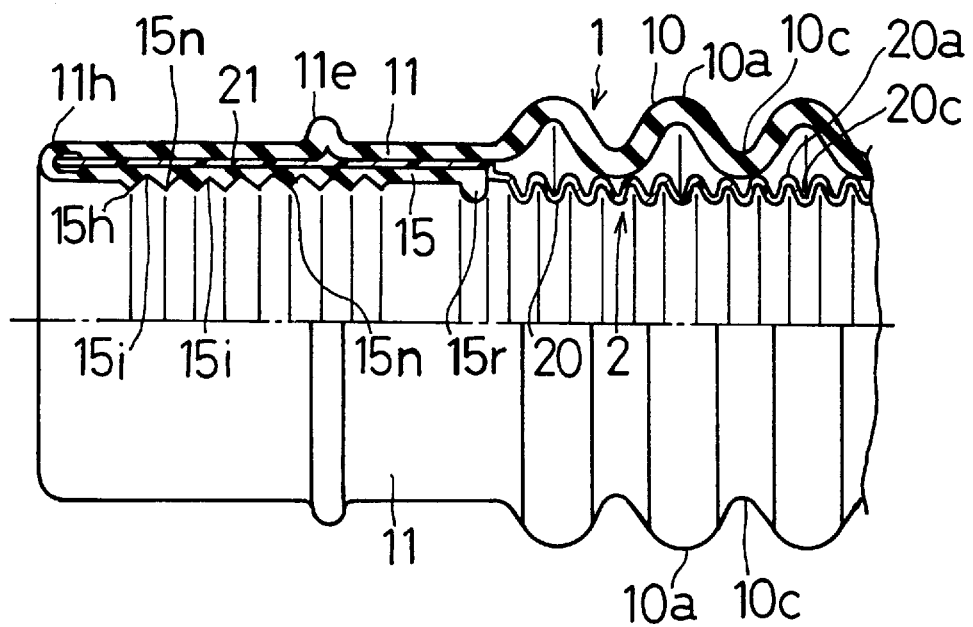
FIG. 26 is a side view partly in section, of the twelfth embodiment is inserted, before a mating pipe member thereinto.

The twelfth embodiment will be hereinafter described with reference to FIGS. 22 through 26. FIG. 22 illustrates the overall construction of the present hose after the assembly, FIG. 23 illustrates an outer hose member before the assembly, and FIG. 24 illustrates an inner hose member before the assembly. FIG. 25 and 26 illustrate the present hose in the course of the assembly.

As illustrated in FIG. 22, the hose is comprised of an outer hose member 1, and an inner hose member 2 disposed in a central hole 1i of the outer hose member 1 substantially coaxially.

As illustrated in FIG. 23, the outer hose 1 includes a first bellows-like tubular portion 10 disposed in the intermediate area so as to extend in an axial direction and first straight tubular end portions 11 that extend axially and tubular foldable portions 15 integrally extending from the ends of the first straight tubular portions 11 by way of arc-shaped thin-walled portions 11h. The first bellows-like tubular portion 1 includes ribs 10a and grooves 10c, both of which extend like a ring throughout. A corrugation height of the first bellows-like tubular portion 10 is designed to be about 7.5–10 mm. A thickness of the peripheral walls of the first bellows-like tubular portion 10 and the first straight tubular portions 11 is designed to be about 2–4 mm. In addition, the first straight tubular portions 11 further include a ring-shaped major projection 11e on the outer peripheral surface, a ring-shaped groove 11x formed in the inner peripheral surfaces, and a ring-shaped minor projection 11f on the outer peripheral surface.

As illustrated in FIG. 23, foldable sealing portions 15 include a plurality of sealing projections 15n disposed in series and spaced apart in an axially lengthwise direction, a plurality of thin-walled portions 15i disposed between the sealing projections 15n, which have a thickness smaller than that of the sealing projections 15n, and a ring-shaped stopper projection 15r disposed at the axial end. The sealing projections 15n have a substantially triangular shape in cross-section before assembly.

As a material for the outer hose member 1, a mixture of nitrile rubber (NBR) and polyvinyl chloride (PVC) is used to produce the desired anti-flammability, anti-wear and anti-oil properties. The outer hose 1 is formed by injection molding followed by vulcanization.

As illustrated in FIG. 24, the inner hose member 2 includes a second bellows-like portion 20 disposed in the intermediate area and also extending in an axial lengthwise direction, and second straight axially extending tubular portions 21 disposed at the ends. The second bellows-like tubular portion 20 includes ribs 20a and grooves 20c, both of which extend like a ring thereabout. Further, a ring-shaped projection 21x is formed on the outer periphery of the second straight tubular portions 21. An outside diameter of the second straight tubular portions 21 is designed to be substantially equal to the inside diameter of the first straight tubular portions 11.

In the second bellows-like tubular portion 20, a pitch between the neighboring ribs 20a of the inner hose member 2 is designed to be smaller than the pitch between the neighboring tops or ribs 10a of the outer hose member 1. A corrugation height of the second bellows-like tubular portion 20 is designed to be about 3–5 mm, and accordingly it is smaller than the corrugation height of the first bellows-like tubular portion 10. Further, as can be appreciated from FIG. 22, an outside diameter of the ribs 20a is designed to be smaller than an outside diameter of the second straight tubular portions 21. The inner hose member 2 having these dimensional features advantageously assures a desired flexibility for the hose, and the dimensional features advantageously inhibit the inner hose 2 from interfering with the outer hose 1 during bending.

The inner periphery of the inner hose member 2 constitutes a passage hole 2i adapted for conveying a fluid such as gasoline fuels. A thickness of the peripheral wall of the inner hose member 2 is designed to be about 0.5–1.0 mm.

As a material for the inner hose member 2, polyamide resin (e.g., nylon 11, nylon 6, nylon 12, or the like) is used to provide a suitable barrier, the desired flexibility, and other hose characteristics. The inner hose 2 can be formed by blow molding, injection blow molding, extrusion blow molding, or the like.

In the present hose, the outer hose 1 and the inner hose 2 are formed independently. Then, as illustrated in FIG. 25, the inner hose 2 is inserted into the outer hose 1. During insertion, projections 21x of the inner hose 2 engage grooves 11x of the outer hose 1, thereby positioning the inner hose 2 in the outer hose 1. Under the assembled state, one of the foldable sealing portions 15 is folded inwardly at one of the arc-shaped thin-walled portions 11h. For example, it can be folded in the direction of the arrow "Y1" of the FIG. 25. Thus, as illustrated in FIG. 26, the second straight tubular portions 21 of the inner hose member 2 are held between the first straight tubular portions 11 and the foldable sealing portions 15. Further, as can be appreciated from FIG. 22, mating members, e.g., mating pipes 7 having a ring-shaped end 7c capable of expanding the diameter of the hose, are inserted into the foldable sealing portions 15 in the direction of the arrow "X1". Thereafter, the first straight tubular portions 11 of the outer hose member 1 are clamped with clamping members 4 disposed externally therearound. The stopper projection 15r of the foldable sealing portions 15 stops and correctly positions the mating pipes 7 being inserted.

When assembled, as can be understood from FIG. 22, the present hose is integrated at the ends of the outer hose 1 and the inner hose 2 with the foldable sealing portions 15. The ends are sealed securely in the boundary area between the outer peripheries of the mating pipes 7 and the foldable sealing portions 15 by bringing the sealing projections 15n of the foldable sealing portions 15 into contact with the outer peripheries of the mating pipes 7. Also, as can be appreciated from FIG. 22, the present hose is sealed in the boundary area between the inner peripheries of the second straight tubular portions 21 and the foldable sealing portions 15, and boundary area between the second straight tubular portions 21 and the first straight tubular portions 11. Thus, a volatile fluid, like gasoline fuels, flowing in the present hose is inhibited from permeating through the boundary areas.

Thus, the present hose the second straight tubular portions 21 are held and sealed between the first straight tubular portions 11 and the foldable sealing portions 15. As a result, the hose is sealed securely in the aforementioned boundary areas, thereby inhibiting permeation of fluid therethrough like fuels such as gasoline.

Further, since the foldable sealing portions 15 are provided with sealing projections 15n and thin-walled portions 15i that are disposed in series in an axial lengthwise direction, the thin-walled portions 15i securely provide spaces which can permit the deformed sealing projections 15n to be accommodated therein during the insertion of the mating pipes 7. Hence, the present hose not only provides sealing in the boundary area between the foldable sealing portions 15 and the outer peripheries of the mating pipes 7, but also permits smooth and easy insertion of mating pipes 7.

Furthermore, the tubular foldable sealing portions 15 can be folded starting at either of the ring-shaped thin-walled portions 15i disposed between the sealing projections 15n, thereby increasing the degree of freedom in the selection of the points for folding the foldable sealing portions 15. Thus, the foldable sealing portions 15 allow one to advantageously cope with the relative fluctuations in the axial lengthwise dimensions of the outer hose member 1 and the inner hose member 2.

Moreover, the tubular foldable sealing portions 15 extend integrally from the first straight tubular portions 11 of the outer hose member 1 and are utilized to securely provide the sealing property. Therefore, such a construction more advantageously improves assembly and reduces manufacturing costs than would otherwise be the case where an independently prepared sealing member is utilized.

In addition, since the ring-shaped projections 21x of the inner hose member 2 are engaged with the ring-shaped grooves 11x of the outer hose member 1, the inner hose member 2 can be securely positioned in the outer hose member 1.

Thirteenth Preferred Embodiment

Figure 27:
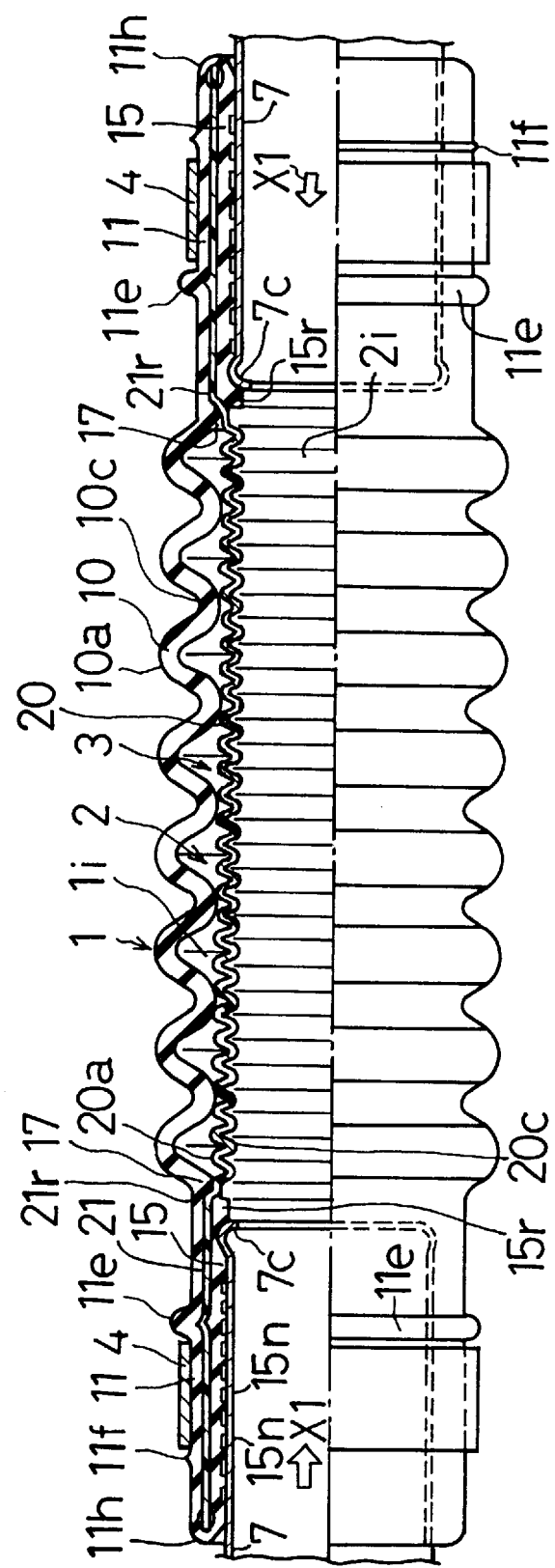
FIG. 27 is a side view, partly in section, of a thirteenth embodiment of the present invention.
Figure 28:
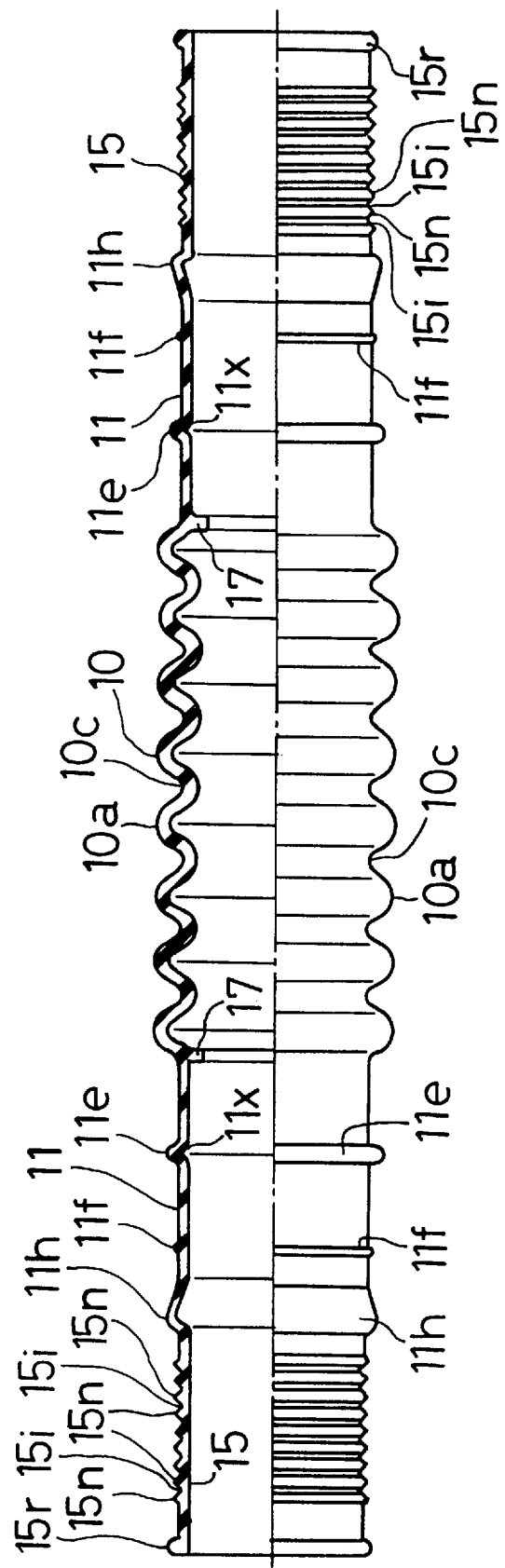
FIG. 28 is a side view, partly in section, of the outer hose member of the thirteenth embodiment.
Figure 29:
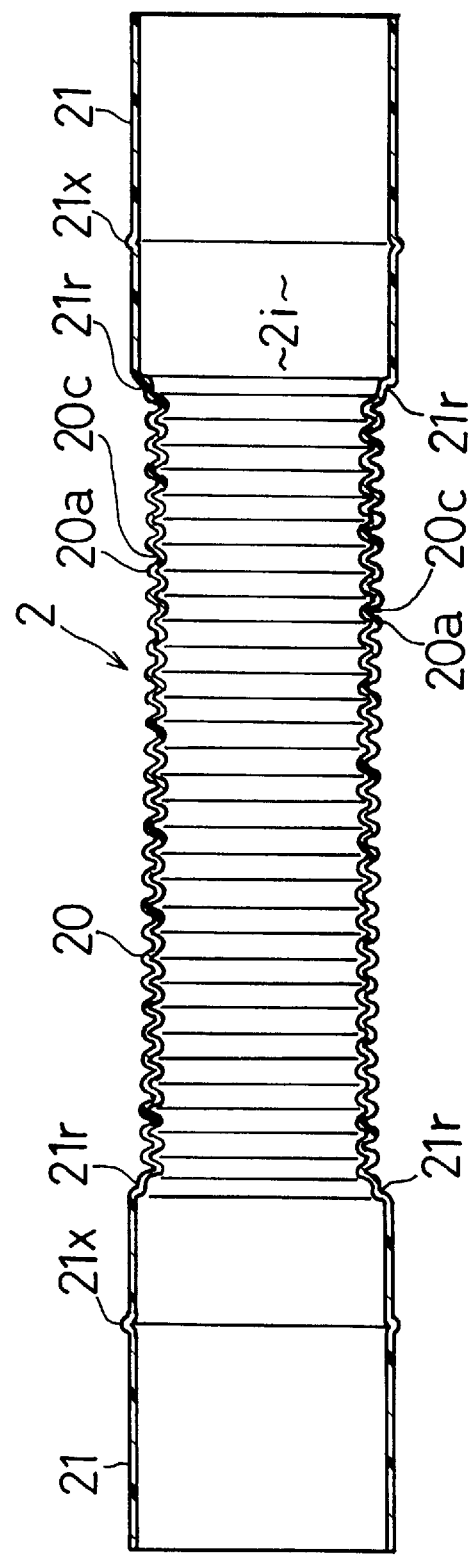
FIG. 29 is a cross-sectional view of the inner hose member of the thirteenth embodiment.
Figure 30:
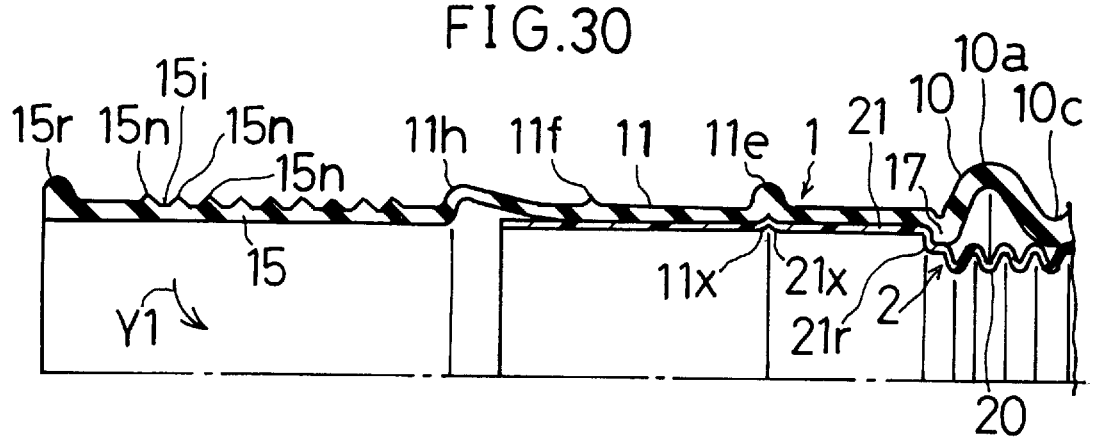
FIG. 30 is a cross-sectional view of an end of the thirteenth embodiment during assembly.
Figure 31:
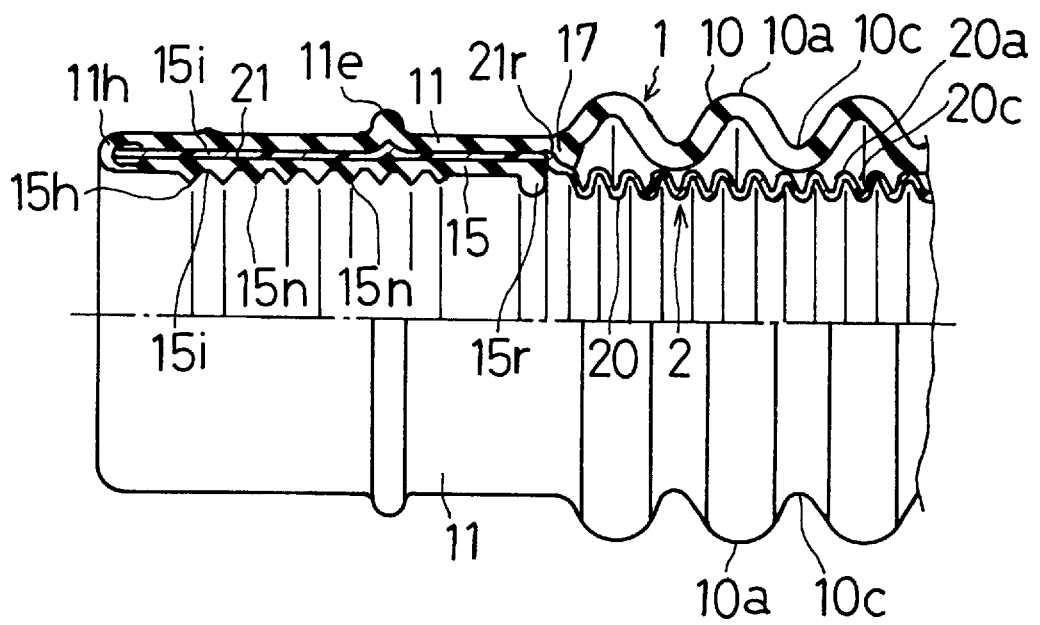
FIG. 31 is a side view, partly in section, of the thirteenth embodiment, before mating member is inserted thereinto.

The thirteenth embodiment will be hereinafter described with reference to FIGS. 27 through 31. FIG. 27 illustrated the overall construction of the present hose after the assembly, FIG. 28 illustrates an outer hose member before the assembly and FIG. 29 illustrates an inner hose member before the assembly. FIGS. 30 and 31 illustrate the present hose in the course of the assembly.

As illustrated in FIG. 27, the hose is still comprised of an outer hose member 1, and an inner hose member 2 disposed in a central hole 1i of the outer hose member 1 substantially coaxially.

As illustrated in FIGS. 27 and 28, the outer hose 1 continues to include a first bellows-like tubular portion 10, first straight tubular portions 11 disposed at the ends, and foldable sealing portions 15, having a tubular shape, integrally extending from the ends of the first straight tubular portions 11 by way of arc-shaped thin-walled portions 11h.

The first bellows-like tubular portion 10 includes ribs boa and grooves 10c, both of which extend like a ring. The corrugation height of the first bellows-like tubular portion 10 is designed to be about 7.5–10 mm. A thickness of the peripheral walls of the first bellows-like tubular portion 10 and the first straight tubular portions 11 is designed to be about 2–4 mm. In addition, the first straight tubular portions 11 further include a ring-shaped major projection 11e on the outer peripheral surfaces, a ring-shaped groove 11x in the inner peripheral surfaces, and a ring-shaped minor projection 11f on the outer peripheral surfaces.

In the present hose, as illustrated in FIGS. 27 and 28, the first straight tubular portions 11 are provided with a ring-shaped regulatory projection 17 which projects inwardly in a radial direction on the inner periphery adjacent the first bellows-like tubular portion 10. The foldable sealing portions 15 include a plurality of sealing projections 15n disposed in series in the axially lengthwise direction, a plurality of thin-walled portions 15i disposed between the sealing projections 15n and having a thickness smaller than that of the sealing projections 15n, and a ring-shaped holder projection 15r disposed at the axial end. The sealing projections 15n have a substantially triangular shape in cross-section before assembly.

As a material for the outer hose member 1, a mixture of nitrile rubber (NBR) and polyvinyl chloride (PVC) is used as noted previously. The outer hose member 1 is also formed by injection molding followed by vulcanization.

As illustrated in FIG. 29, the inner hose member 2 also still includes a second bellows-like portion 20 and second straight tubular portions 21 disposed at the ends. The second bellows-like tubular portion 20 includes ribs 20a and grooves 20c, both of which extend like a ring. Further, a ring-shaped engager projection 21r is formed so as to project in a radial direction at the boundary between the second straight tubular portions 21 and the second bellows-like tubular portions 20, and a ring-shaped projection 21x is formed on the outer periphery of the second straight tubular portions 21. An outside diameter of the second straight tubular portions 21 is designed to be substantially equal to an inside diameter of the first straight tubular portions 11.

In the second bellows-like tubular portion 20, a pitch between the neighboring ribs 20a is designed to be smaller than a pitch between the neighboring ribs 10a. A corrugation height of the second bellows-like tubular portion 20 is designed to be about 3–5 mm, and accordingly it is smaller than the corrugation height of the first bellows-like tubular portion 10. Further, as can be appreciated from FIG. 29, an outside diameter of the ribs 20a is designed to be smaller than an outside diameter of the second straight tubular portions 21. The inner hose member 2 having these dimensional features advantageously assures proper flexibility for the entire hose, and advantageously inhibits the inner hose member 2 from interfering with the outer hose member 1 when flexing or bending.

The inner periphery of the inner hose member 2 constitutes a passage hole 2i adapted for conveying a fluid such as volatile fuels, for example, gasoline, or the like. A thickness of the peripheral wall of the inner hose member 2 is designed to be about 0.5–1.0 mm.

As a material for the inner hose member 2, polyamide resin (e.g., nylon 11, nylon 6, nylon 12, or the like) as noted previously. The inner hose member 2 can be formed by blow molding, injection blow molding, extrusion blow molding, or the like.

The outer and inner hoses are formed independently and, as illustrated in FIG. 30, the inner hose member 2 is inserted into the outer hose member 1. During insertion, the engager projections 21r of the inner hose member 2 are engaged with the regulatory projections 17 of the outer hose member 1, thereby positioning the inner hose 2 in the outer hose 1. When assembled, one of the foldable sealing portions 15 is folded inwardly at one of the arc-shaped thin-walled portions 11h. For example, it is folded in the direction of the arrow "Y1" of the FIG. 30. Thus, as illustrated in FIG. 31, the engager projections 21r of the inner hose member 2 are held between the regulatory projections 17 of the first straight tubular portions 11 and the holder projections 15r of the foldable sealing portions 15 in the axially lengthwise direction. It is held therebetween by a fastening allowance of, for instance, 0.1–0.5 mm in the axially lengthwise direction. Therefore, the inner hose member 2 is inhibited from moving relatively in the axially lengthwise direction.

Moreover, as can be understood from FIG. 27, mating members, e.g., mating pipes 7 having a ring-shaped end 7c capable of expanding the diameter of the fordable sealing portion 15, are inserted into the foldable sealing portions 15 in the direction of the arrow "X1" of the drawing until their ends press against the holder projections 15r of the foldable sealing portions 15. Here, the holder projection 15r of the foldable sealing portions 15 can operate as a stopper against the mating pipes 7 being inserted. Thereafter, the first straight tubular portions 11 of the outer hose member 1 are clamped with clamping members 4 disposed externally therearound.

When assembled, as can be understood from FIG. 27, the engager projections 21r of the inner hose member 2 are held between the regulatory projections 17 and the holder projections 15r of the outer hose member 1, and the inner and outer peripheries of the engager projections 21r are sealed by them. Further, the present hose is sealed in the boundary area between the outer peripheries of the mating pipes 7 and the foldable sealing portions 15 by closely bringing the sealing projections 15n of the foldable sealing portions 15 into contact with the outer peripheries of the mating pipes 7. Also, as can be appreciated from FIG. 27, the present hose is sealed in the boundary area between the inner peripheries of the second straight tubular portions 21 and the foldable sealing portions 15, and the boundary area between the second straight tubular portions 21 and the first straight tubular portions 11 of the outer hose member 1. Thus, volatile fluids, like gasoline fuels flowing in the present hose, will be inhibited from permeating through such sealed boundary areas.

As having been described so far, in the present hose, the first straight tubular portions 11 of the outer hose member 1 include the regulatory projections 17 which are adapted to hold the engager projections 21r of the inner hose member 2 together with the holder projections 15r of the foldable sealing portions 15. With the regulatory projections 17, the inner hose member 2 is inhibited from moving relatively in the axial lengthwise direction. Since the first straight tubular portions 11 and the second straight tubular portion 21 are integrated securely in the axially lengthwise direction, the present hose provides improved assembly during the insertion of the mating pipes 7.

In the present, regulatory projections 17 and the holder projections 15r of the outer hose member 1, both of which are adapted to hold the engager projections 21r of the foldable sealing portions 15, are made of rubber. As a result, the present hose provides an enhanced sealing property reliably in the inner and outer peripheries of the engager projections 21r even when the mating pipes 7 are inserted.

Additionally, in the present hose following insertion of the mating pipes 7, as can be understood from FIG. 27, the diameter-expandable ends 7c of the mating pipes 7 press heavily against the holder projections 15r of the foldable sealing portions 15 by the fastening allowance of 0.1–0.5 mm, thereby enhancing the degree of the holding. Therefore, the present hose can be expected to exhibit a further enhanced sealing property, and accordingly, it can advantageously inhibit volatile fluid, like the gasoline fuels, from permeating through the hose.

As discussed before while the positions of the regulatory projections 17 and the holder projections 15r of the outer hose member 1 and the engager projections 21r of the inner hose member 2 fluctuate in the axially lengthwise direction due to errors in the dimensional tolerances during forming of the parts, the degree can vary from very slight to enough to inhibit suitable holding. The present invention provides for the ability to accommodate such fluctuations because the first bellows-like tubular portion 10 of the outer hose member 1 and the second bellows-like tubular portion 20 of the inner hose member 2 have bellows-like shapes which can expand and contract axially. In this way, the dimensional fluctuations can be absorbed by the expansion or contraction of the bellows-like shapes, thereby securely holding of the engager projections 21r between the holder projections 15r and the regulatory projections 17.

Since the foldable sealing portions 15 are provided with the sealing projections 15n and the thin-walled portions 15i disposed in series in the axially lengthwise direction, the thin-walled portions 15i provide spaces which permit the deformed sealing projections 15n to be accommodated therein during the insertion of the mating pipes 7. Hence, the present hose not only provides the sealing property in the boundary area between the foldable sealing portions 6 and the outer peripheries of the mating pipes 7, but it enables easy insertion of mating pipes 7.

The tubular foldable sealing portions 15 can be folded starting at either of the ring-shaped thin-walled portions 15i disposed between the sealing projections 15n, thereby increasing the degree of freedom in the selection of the points for folding the foldable sealing portions 15. Thus, the foldable sealing portions 15 allow the invention to advantageously cope with the relative fluctuations in the axial or lengthwise dimensions of the outer hose member 1 and the inner hose member 2.

Moreover, in the present hose, the tubular foldable sealing portions 15 extend integrally from the first straight tubular portions 11 of the outer hose member 1, and are utilized to assure proper sealing. Therefore, such a construction is also more advantageous and improves assembly to reduce manufacturing costs over use separate sealing members.

Fourteenth Preferred Embodiment

The fourteenth embodiment will be described with reference to FIGS. 32 and 33. This comprises a modified version of the thirteenth embodiment, and it has basically the same construction as the thirteenth embodiment. However, an independently prepared sealing member 6, illustrated in FIG. 33, is used instead of the foldable sealing portions 15.

Figure 33:
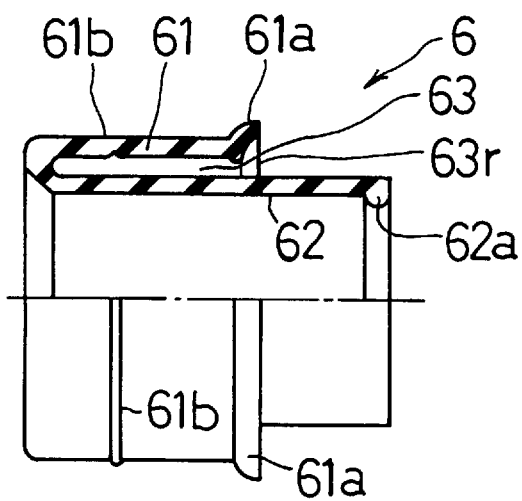
FIG. 33 is a side view, partly in section, of a sealing member usual in FIG. 32.

As illustrated in FIG. 33, the sealing member 6 includes a ring-shaped outer sealing portion 61, a ring-shaped inner sealing portion 62 extending integrally from the outer sealing portion 61, and a ring-shaped sealing groove 63 having annular-shaped opening 63r. The outer sealing portions 61 has a ring-shaped major projection 61a, and a ring-shaped minor projection 61b on the outer periphery. The inner sealing portion 62 has holder projection 62a on the inner periphery. The sealing member 6 is formed by injecting a mixture of nitrile rubber and polyvinyl chloride followed by vulcanization.

In the present hose, the first straight tubular portions 11 of the outer hose member 1 and the second straight tubular portions 21 of the inner hose member 2 have a superimposed relationship and they are engaged with the ring-shaped sealing grooves 63 of the sealing members 6. Thereafter, the sealing members 6 are fastened to the first straight tubular portions 11 of the outer hose member 1 with clamping members 4 disposed externally around the outer peripheries of the sealing members 6.

The engager projections 21r of the inner hose member 2 are held by the regulatory projections 17 of the first straight tubular portions 11 and the holder projections 62a of the sealing member 6. As a result, the inner hose member 2 can be inhibited from moving relatively axially or in a lengthwise direction during the insertion of the mating pipes 7 assembly, thereby improving the assembly operation.

Figure 32:
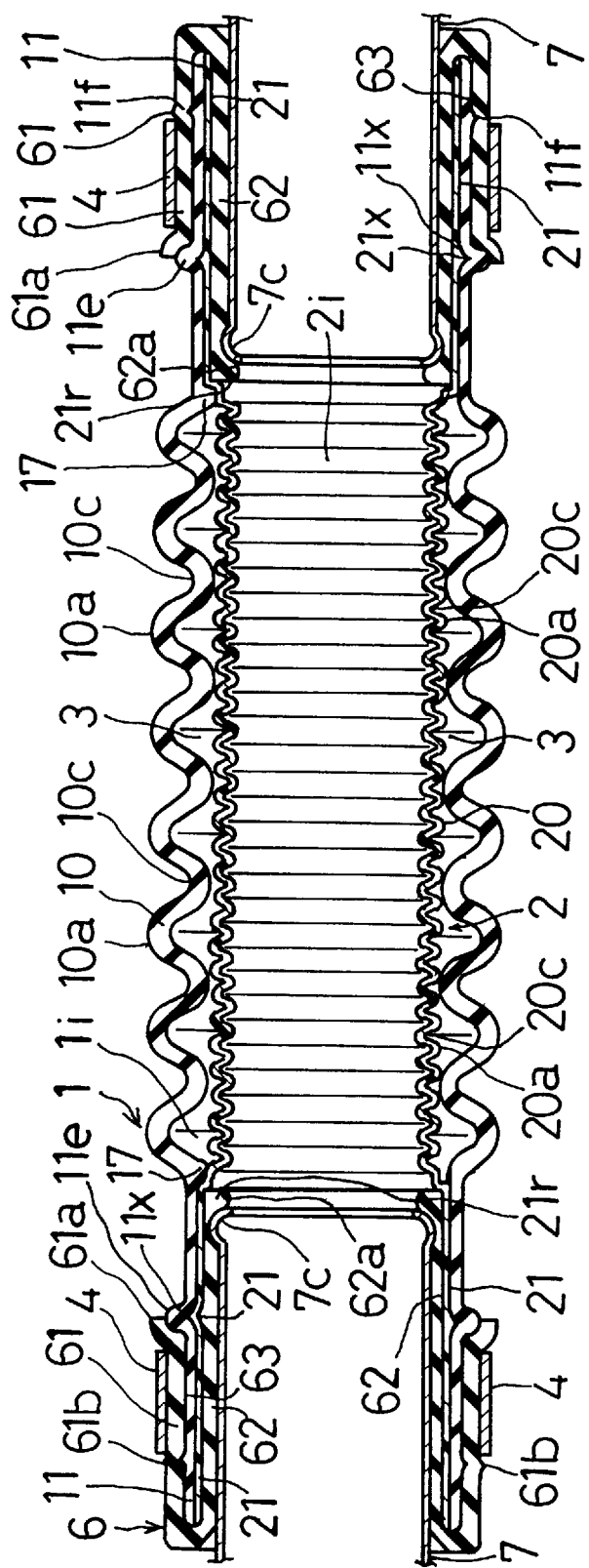
FIG. 32 is a cross-sectional view of a fourteenth embodiment of the present invention.

Likewise, with the mating pipes 7 inserted, as FIG. 32, the diameter-expandable ends 7c of the mating pipes 7 heavily pres against the holder projections 62a of the sealing members 6, thereby enhancing the degree of holding. Therefore, the present hose can be expected to exhibit a further enhanced sealing property.

Fifteenth Preferred Embodiment

Figure 34:
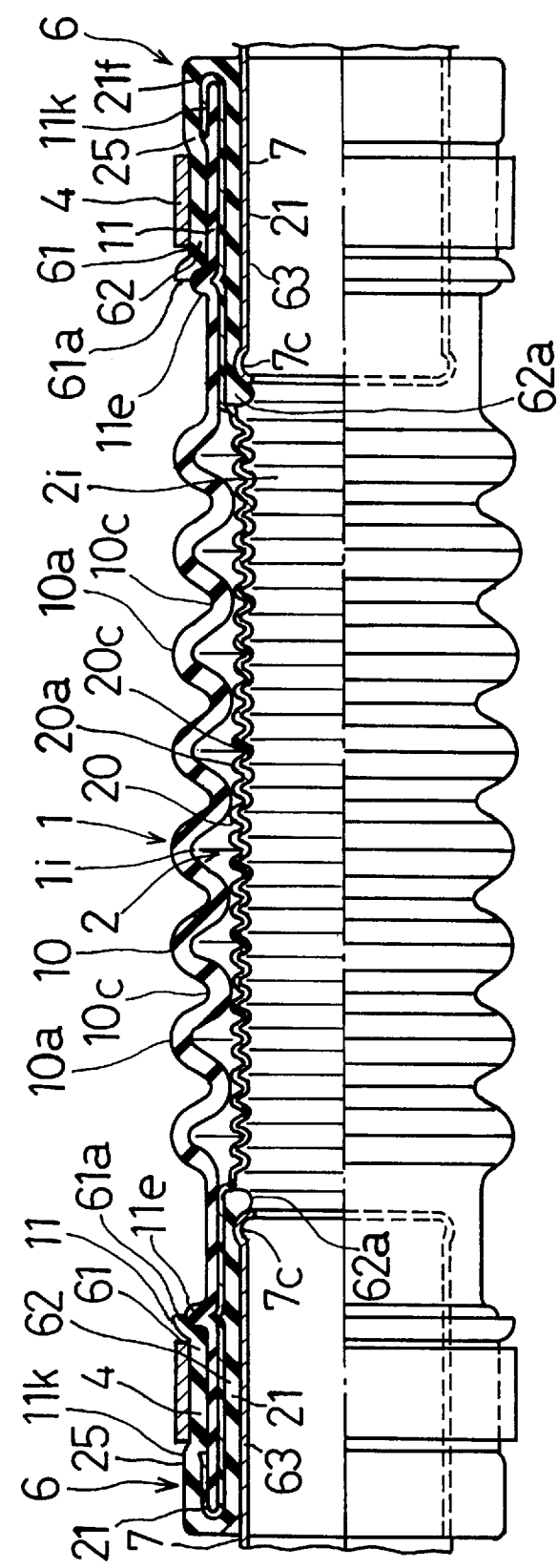
FIG. 34 is a side view, partly in section, of a fifteenth embodiment of the present invention.
Figure 35:
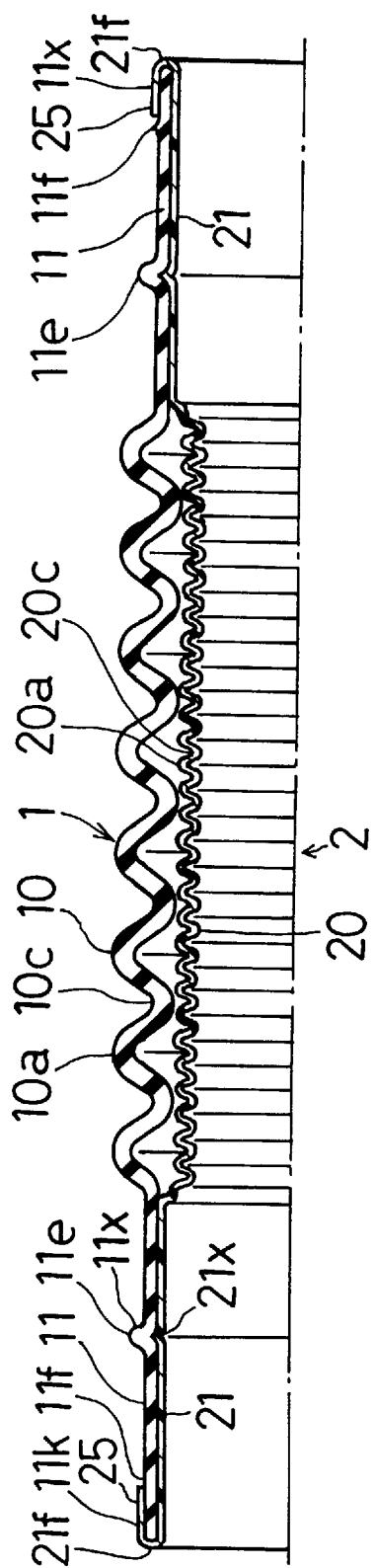
FIG. 35 is a cross-sectional view of the fifteenth embodiment showing the inner hose disposed in an outer hose.

The fifteenth embodiment is set forth in FIGS. 34 through 36. FIG. 34 illustrates the whole cross-sectional view of the present hose after the assembly. FIG. 35 illustrates an outer hose member of the present hose during assembly. FIG. 36 illustrates an inner hose member of the present hose before the assembly.

As illustrated in FIG. 34, the present hose comprises an outer hose member 1, an inner hose member 2 disposed in a central hole 1i of the other hose member 1, and sealing members 6 disposed at the ends.

As illustrated in FIG. 35, the outer hose member 1 includes a first, intermediate bellows-like tubular portion 10 and first straight tubular portions 11 disposed at the ends. The first bellows-like tubular portion 10 includes ribs 10a and grooves 10c, both of which extend like a ring. A corrugation height the first bellows-like tubular portion 10 is designed to be about 7.5–10 mm. A thickness of the peripheral wall of the outer hose member 1 is designed to be about 2–4 mm. Further, a ring-shaped major projection 11e and a ring-shaped minor projection 11f are formed on the outer periphery of the first straight tubular portions 11 of the outer hose member 1. Furthermore, the major projection 11e is provided with a ring-shaped groove 11x in the inner periphery.

As a material for the outer hose member 1, a mixture of nitrile rubber (NBR) and polyvinyl chloride (PVC) is used in view of the anti-flammability, the anti-wear property, the anti-oil property, and the like. The outer hose member 1 is formed by injection molding followed by vulcanization.

FIG. 36 illustrates an inner hose member 2 of the present hose before the assembly. As illustrated in the drawing, the inner hose member 2 includes a second, intermediate bellows-like portion 20, second straight tubular portions 21 disposed at the ends, and engager tubular portions 25 integrally extending from the ends of the second straight tubular portions 11 by way of arc-shaped portions 21f arced inwardly in the radial direction.

Before assembly, an axial length of the inner hose member 2 is designed to be longer then that of the outer hose member 1 by a dimension of the engager tubular portions 11 disposed at the ends. Further, a ring-shaped projection 21x is formed on the outer periphery of the second straight tubular portions 21. As can be understood from FIG. 35, an outside diameter of the second straight tubular portions 21 is designed to be substantially equal to an inside diameter of the first straight tubular portions 11. Furthermore, the second bellows-like tubular portion 20 includes ribs 20a and grooves 20c, both of which extend like a ring.

The pitch between the neighboring inner hose ribs 20a is designed to be smaller than the pitch between the neighboring outer hose ribs 10a. A corrugation height of the second bellows-like tubular portion 21 is designed to be about 3–5 mm, and, accordingly, is smaller than the corrugation height of the first bellows-like tubular portion 10. Further, as can be appreciated from FIG. 36, an outside diameter of the inner hose ribs 20a is designed to be slightly smaller than an outside diameter of the second straight tubular portions 21. The inner hose member 2 having these dimensional again assures the desired flexibility for the entire hose, and inhibit inner hose member 2 from interfering with the outer hose member 1 when the present hose is bent, such as during installation.

The inner periphery of the inner hose member 2 constitutes a passage hole 2i adapted for conveying a fluid such as gasoline fuels or the like. A thickness of the peripheral wall of the inner hose member 2 is designed to be about 0.5–1.0 mm.

As a material for the inner hose member 2, polyamide resin (e.g., nylon 11, nylon 6, nylon 12, or the like) is for barrier creation and flexibility. The inner hose member 2 can be formed by blow molding, injection blow molding, extrusion blow molding, or the like.

The outer hose member 1 and the inner hose member 2 are assembled together and installed to mating members by way of sealing members 6. The sealing members 6 are identical with those employed by the fourteenth embodiment and illustrated in FIG. 33. Namely, the outer hose member 1, the inner hose member 2, and sealing member 6 are formed independently. Then, as illustrated in FIG. 35, the inner hose member 2 is inserted into the outer hose member 1 substantially concentrically so as to superimpose the first straight tubular portions 11 of the outer hose member 1 and the second straight tubular portions 21 of the inner hose member 2. Thereafter, the engager tubular portions 25 of the inner hose member 2 are folded at the arc-shaped portions 21f outwardly in the radial direction, for instance, in the direction of the arrows "H1" of FIG. 36. As a result, as illustrated in FIG. 35, the engager tubular portions 25 cover the outer peripheries 11k on the axial end sides of the first straight tubular portions 11 of the outer hose member 1, and they engage with the first straight tubular portions 11. Therefore, the second straight tubular portions 21 of the inner hose member 2 and the first straight tubular portions 11 of the outer hose member 1 are assembled with an enhanced integrity. Further, as can be understood from FIG. 35, the projections 21x of the inner hose member 2 are engaged with the grooves 11x of the outer hose member 1. Accordingly, the inner hose member 2 and the outer hose member 1 are assembled with improved integrity.

The second straight tubular portions 11 of the inner hose member 2 and the first straight tubular portions of the outer hose member 1 thus integrated are engaged with the ring-shaped sealing grooves 63 of the sealing members 6. Thus, the sealing members 6 are installed around the axial ends of the inner hose member 2 and the outer hose member 1.

Thereafter, as can be appreciated from FIG. 34, mating members, e.g., mating pipes 7 having a ring-shaped end 7c capable of expanding the diameter are inserted into and engaged with the inner peripheries of the inner sealing portions 62 of the sealing members 6. Then, the sealing members 6 are fastened to the first straight tubular portions 11 of the outer hose member 1 with clamping members 4 disposed externally around the outer peripheries of the sealing members 6. The stopper projections 62a of the sealing member 6 can operate as a stopper against the mating pipes 7 being inserted.

When assembled, as can be understood from FIG. 34, the present hose is sealed in the following boundary areas: the boundary area between the inner peripheries of the second straight tubular portions 21 of the inner hose member 2 and the inner sealing portions 62 of the sealing members 6, the boundary area between the second straight tubular portions 21 of the inner hose member 2 and the first straight tubular portions 11 of the outer hose member 1, the boundary area the first tubular portions 11 of the outer hose member 1 and the outer sealing portions 61 of the sealing members 6, and the boundary area between the outer peripheries of the mating pipes 7 and the inner sealing portions 62 of the sealing member 6. Thus, the fluid like the gasoline fuels flowing in the present hose is inhibited from permeating through the boundary areas.

In addition to the advantageous effects produced by the first embodiment, the fifteenth embodiment of the present hose produces the following extra advantageous effects.

As having been described so far, in the present hose, the engager tubular portions 25 of the inner hose member 2 cover the outer peripheries 11k on the axial end sides of the first straight tubular portions 11 of the outer hose member 1, and they engage with the first straight tubular portions 11, thereby improving the integrity between the second straight tubular portions 21 of the inner hose member 2 and the first straight tubular portions 11 of the outer hose member 1. As a result, the second straight tubular portions 21 of the inner hose member 2 are inhibited from moving relatively with respect to the outer hose member 1. Accordingly, the second straight tubular portions 21 of the inner hose member 2 and the first straight tubular portions 11 of the outer hose member 1 behave integrally. All in all, when installing the sealing members 6 and inserting the mating members 7 in the course of the assembly, the present hose can be assembled with an enhanced assembly operability.

Additionally, the projections 21x of the inner hose member 2 are engaged with the grooves 11x of the outer hose member 1 when assembled. Hence, the inner hose member 2 and the outer hose member 1 are integrated further securely.

Moreover, in the present hose, the first straight tubular portions 11 of the outer hose member 1 and second straight tubular portions 21 of the inner hose member 2 are superimposed each other, and they are engaged with the ring-shaped sealing grooves 63 of the sealing members 6. Then, the mating pipes 7 are inserted into the second straight tubular portions 21 of the inner hose member 2. Thereafter, the sealing members 6 are fastened with the clamping members 4. As a result, the present hose is sealed securely in the aforementioned boundary area, thereby inhibiting the permeation of the fluid like the gasoline fuels.

Having now fully described the present invention, it will be apparent to one of ordinary skill in the art that many changes and modifications can be made thereto without departing from the spirit or scope of the present invention as set forth herein including the appended claims.

What is claimed is:

1. A hose comprising:

an outer hose member formed of rubber, and including an outer end; and an inner hose member formed of resin, disposed substantially coaxially in said outer hose member, and including an inner end adapted to engage with a mating member;

wherein said outer end of said outer hose member further includes a tubular foldable sealing portion which is adapted to be folded onto an inner periphery of said inner end of said inner hose member and to seal a boundary area between said mating member and said inner end of said inner hose member; and said outer hose member further includes a first bellows-like tubular portion at least in an intermediate area thereof in an axial direction thereof, regulatory projections at the starting point of said first bellows-like tubular portion, and holder projections at the end portion of said first bellows-like tubular portion; and said inner hose member is disposed substantially in said outer hose member, further includes a second bellows-like tubular portion in an area thereof corresponding to said first bellows-like tubular portion of said outer hose member and engager projections which are disposed between said second bellows-like tubular portion and the straight portion and sandwiched between said regulatory projections and said holder projections to form a sealing portion at the time of assembly, and is adapted to form a tubular air layer between said second bellows-like tubular portion and said first bellows-like tubular portion.

2. The hose according to claim 1, wherein said tubular foldable sealing portion further includes a plurality of ring-shaped projections disposed on an inner periphery thereof in series in an axially lengthwise direction thereof and adapted to be brought into close contact with an outer periphery of said mating member, and ring-shaped thin-walled portions disposed between the projections and having a thickness smaller than that of the projections.

3. The hose according to claim 1, wherein said holder projections function as stoppers at the time of inserting said mating member.

* * * * *